March 29, 1938. A. O. ABBOTT, JR., ET AL 2,112,513
APPARATUS FOR MANUFACTURING LATEX TUBES
Filed Jan. 7, 1933 18 Sheets-Sheet 2
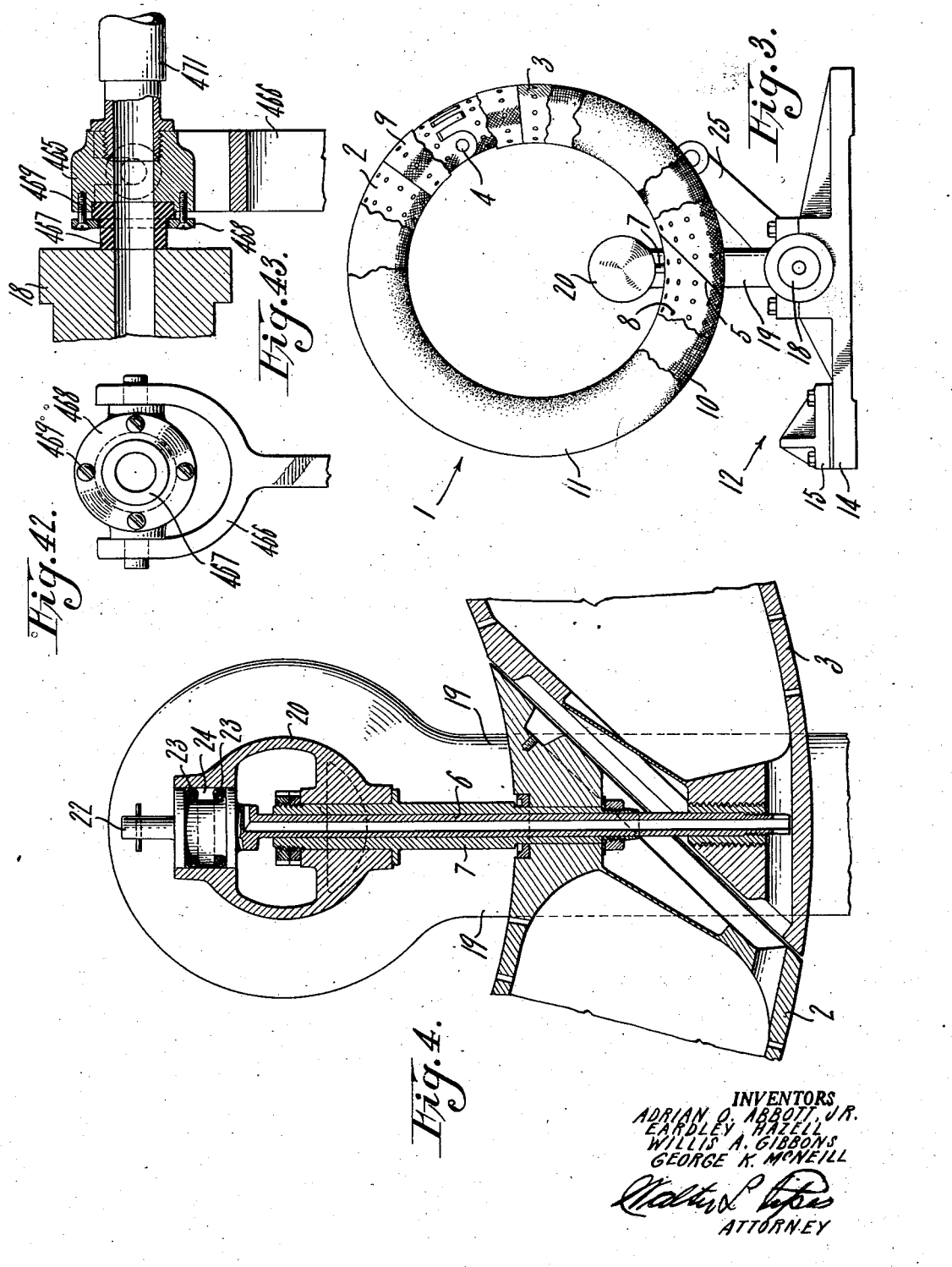
INVENTORS
ADRIAN O. ABBOTT, JR.
EARDLEY HAZELL
WILLIS A. GIBBONS
GEORGE K. McNEILL
ATTORNEY

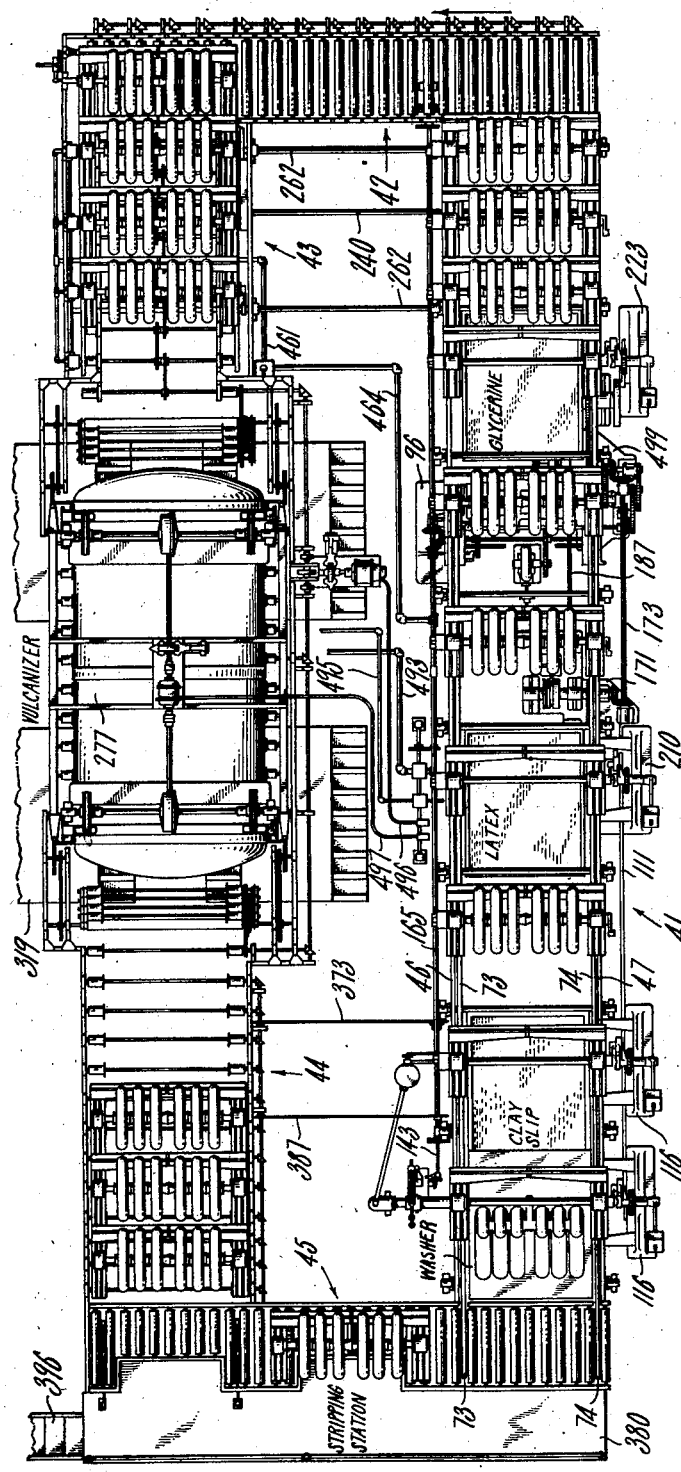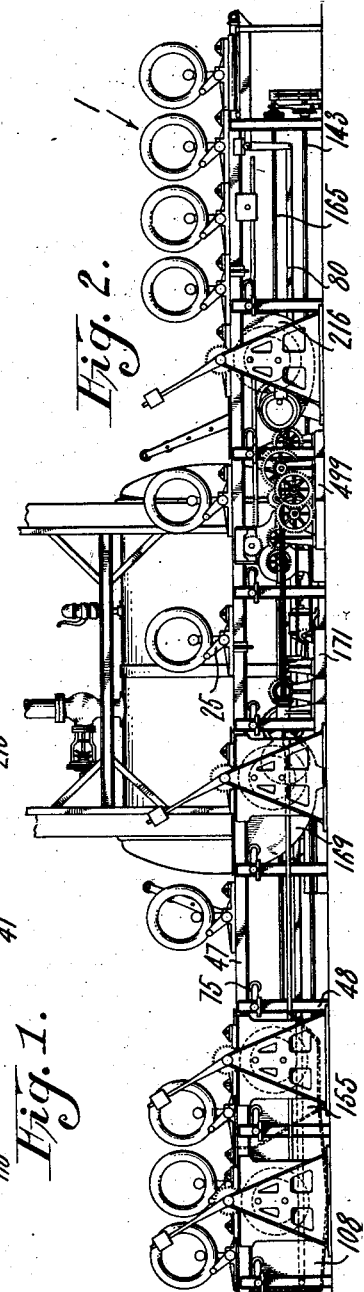

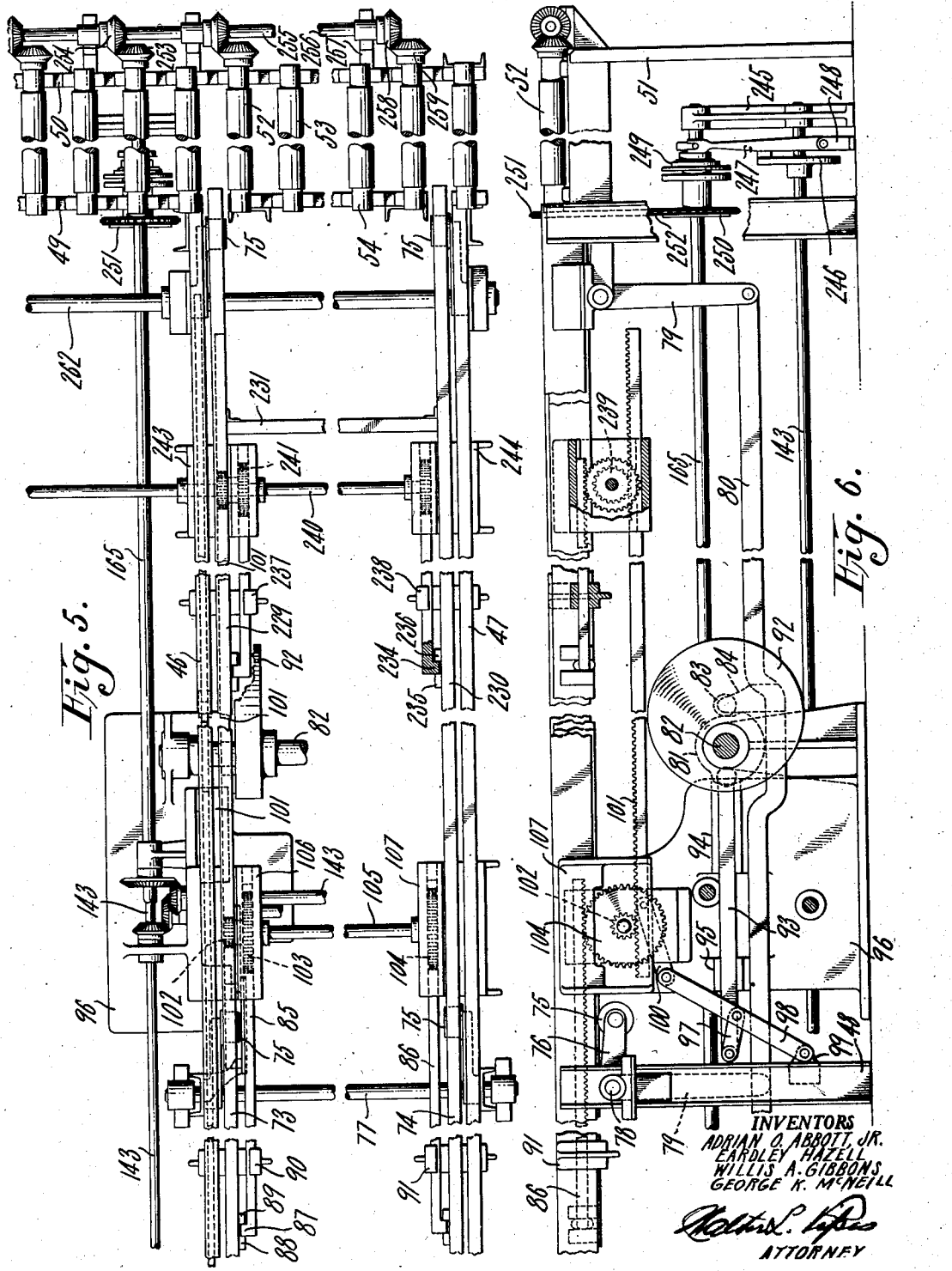

March 29, 1938.   A. O. ABBOTT, JR., ET AL   2,112,513
APPARATUS FOR MANUFACTURING LATEX TUBES
Filed Jan. 7, 1933   18 Sheets—Sheet 4

INVENTORS
ADRIAN O. ABBOTT, JR.
EARDLEY HAZELL
WILLIS A. GIBBONS
GEORGE K. McNEILL

ATTORNEY

March 29, 1938. A. O. ABBOTT, JR., ET AL 2,112,513
APPARATUS FOR MANUFACTURING LATEX TUBES
Filed Jan. 7, 1933 18 Sheets-Sheet 5

INVENTORS
ADRIAN O. ABBOTT, JR.
EARDLEY HAZELL
WILLIS A. GIBBONS
GEORGE K. McNEILL

ATTORNEY

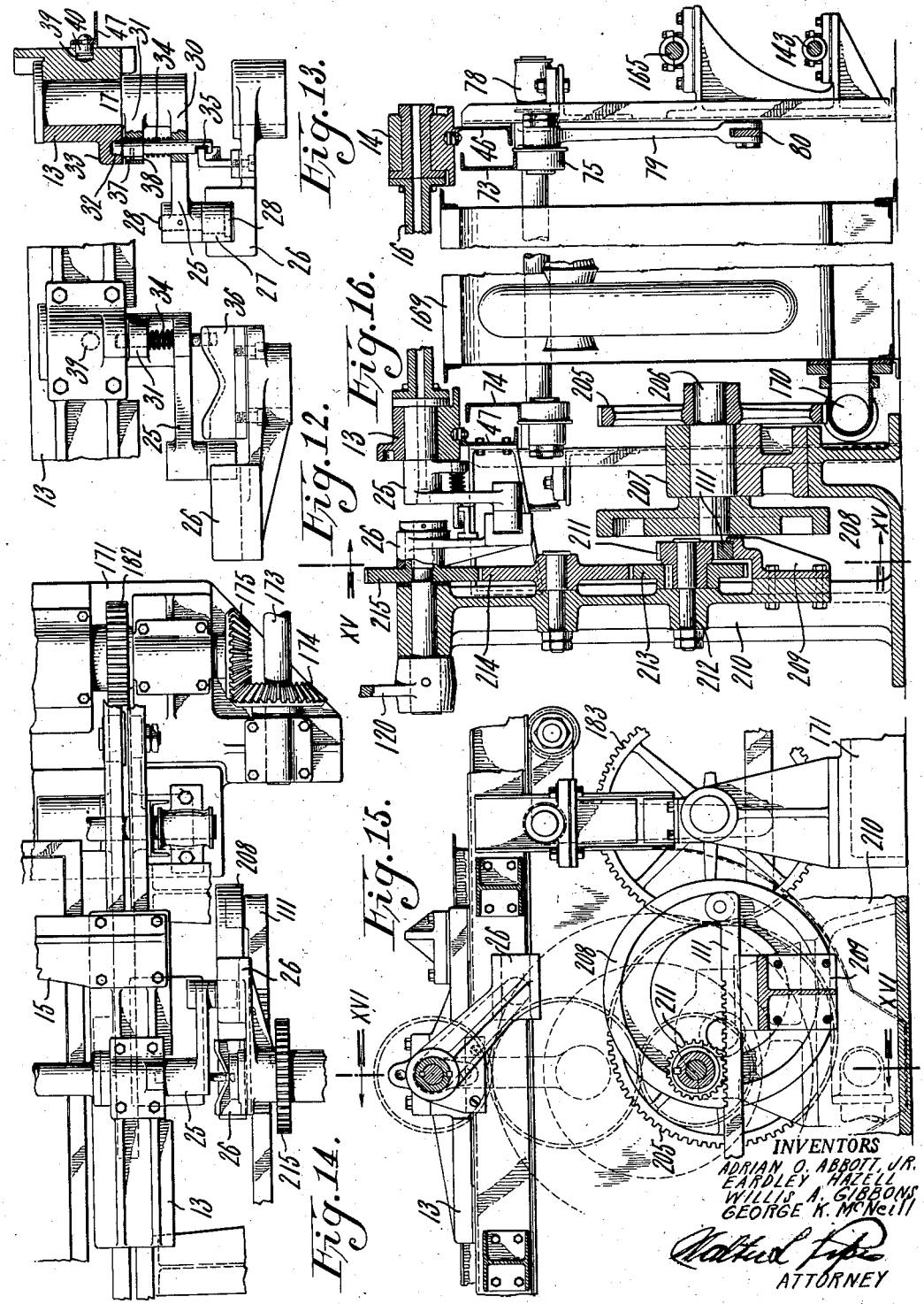

March 29, 1938.  A. O. ABBOTT, JR., ET AL  2,112,513
APPARATUS FOR MANUFACTURING LATEX TUBES
Filed Jan. 7, 1933   18 Sheets-Sheet 7
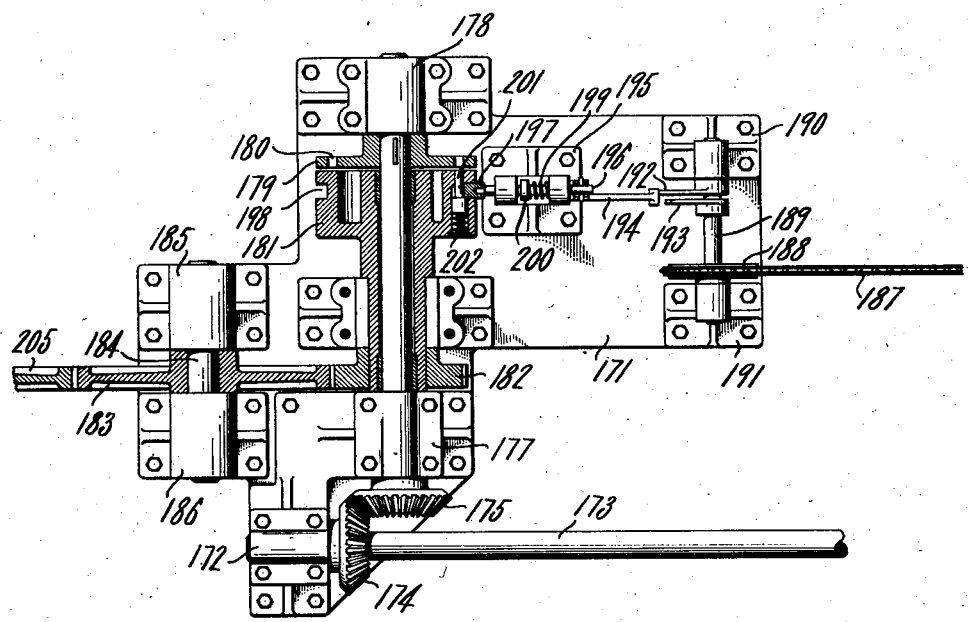
Fig. 17.
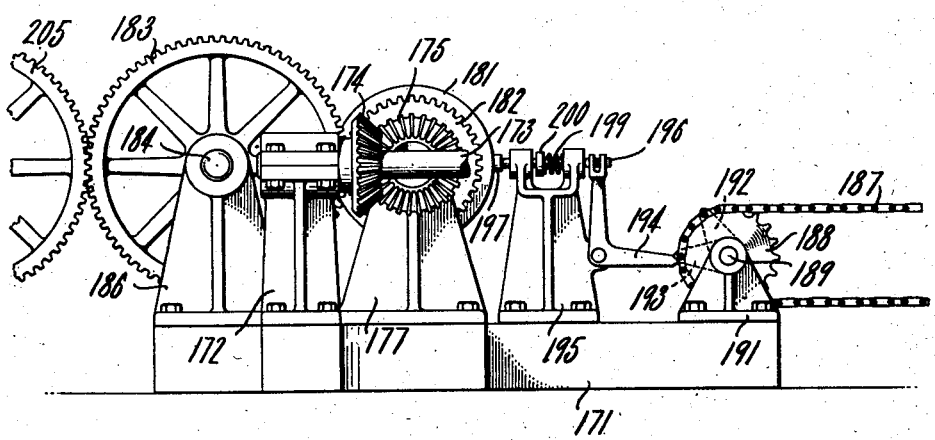
Fig. 18.
INVENTORS
ADRIAN O. ABBOTT, JR.
EARDLEY HAZELL
WILLIS A. GIBBONS
GEORGE K. McNEILL
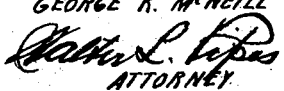
ATTORNEY

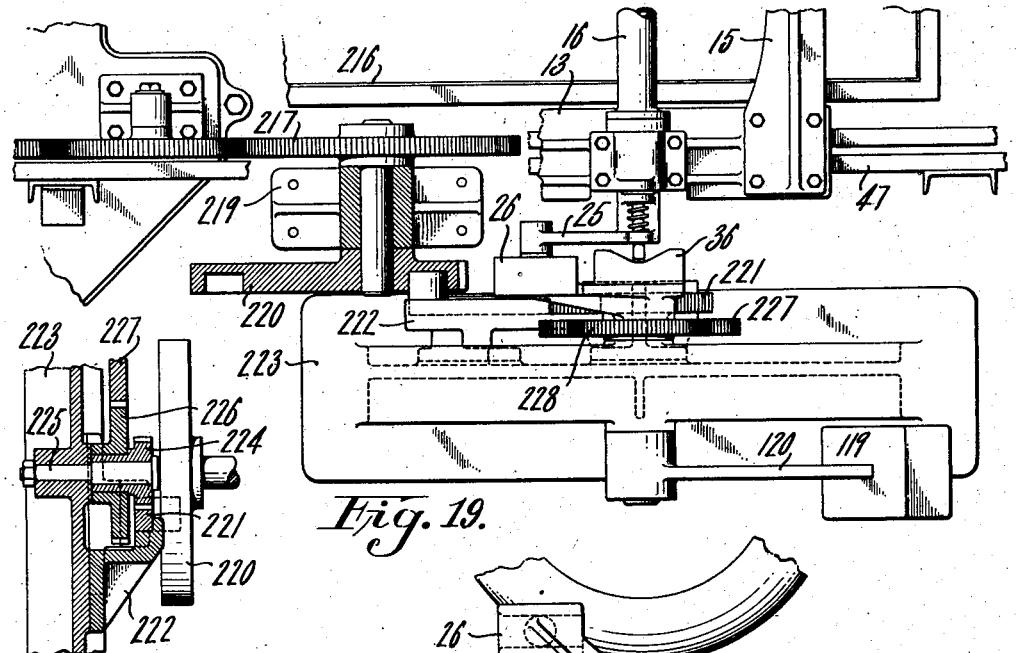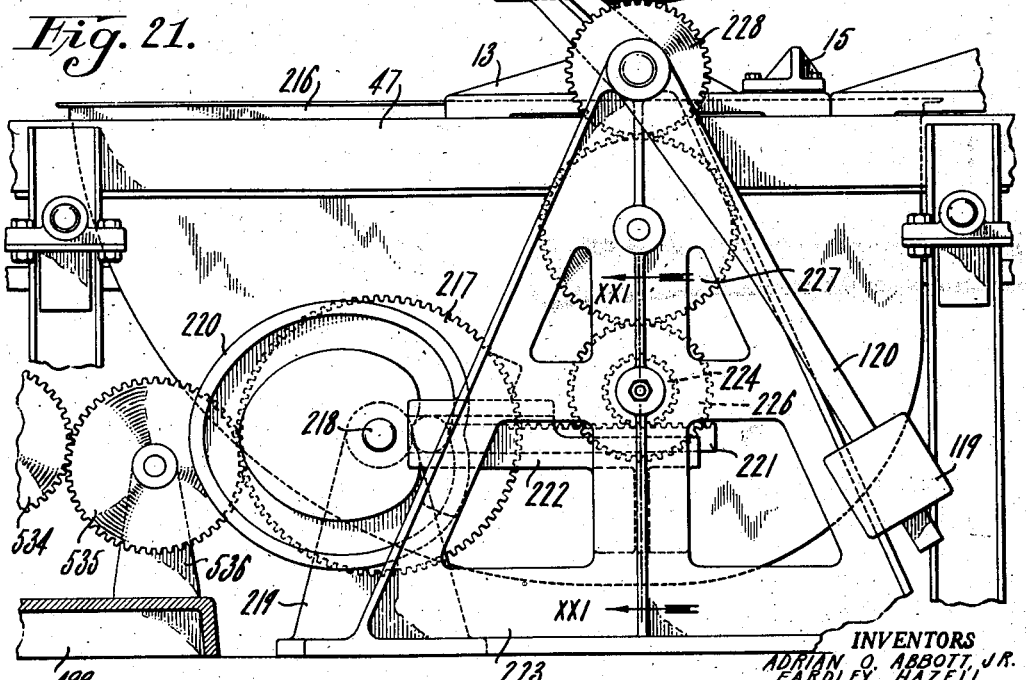

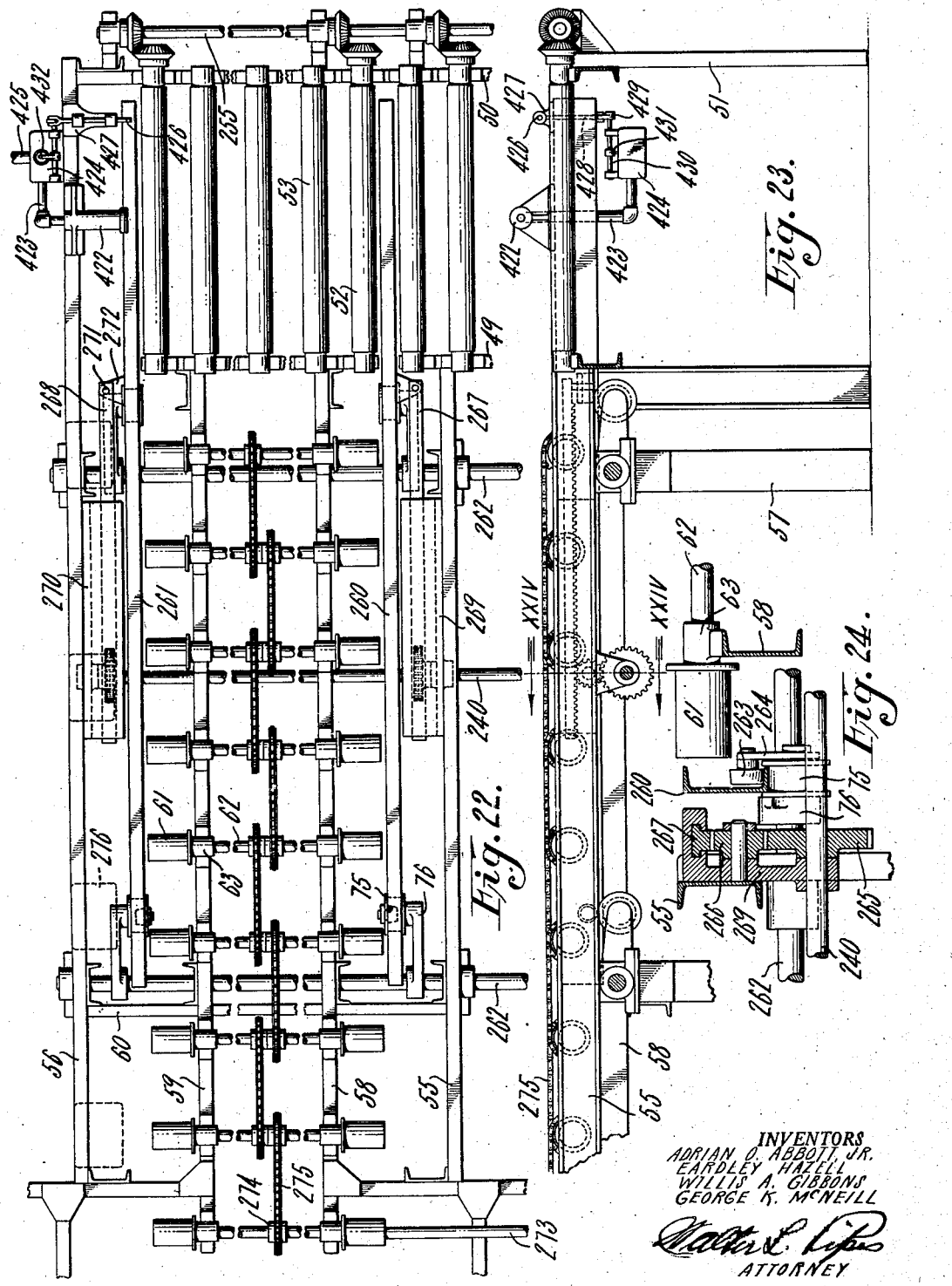

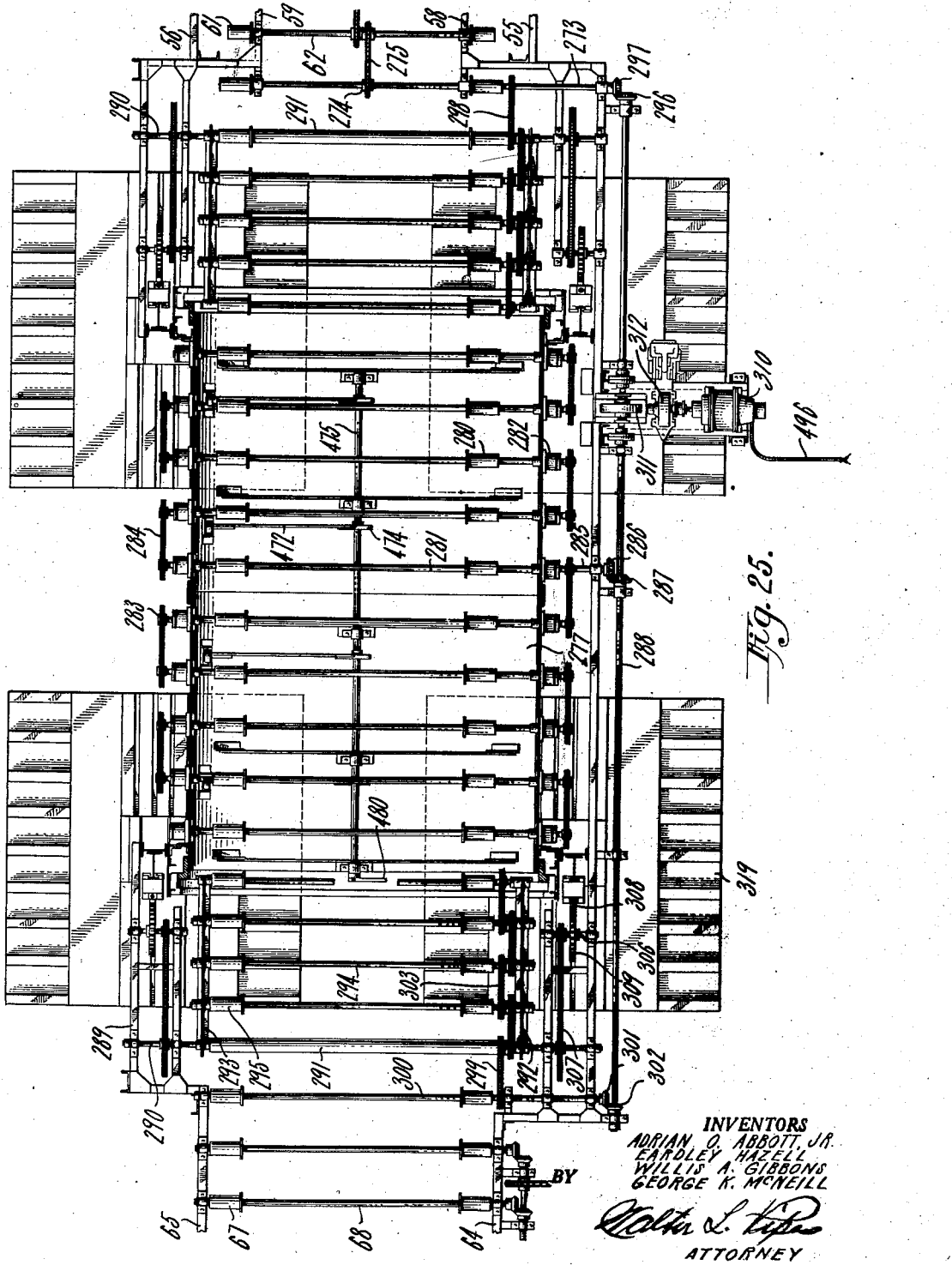

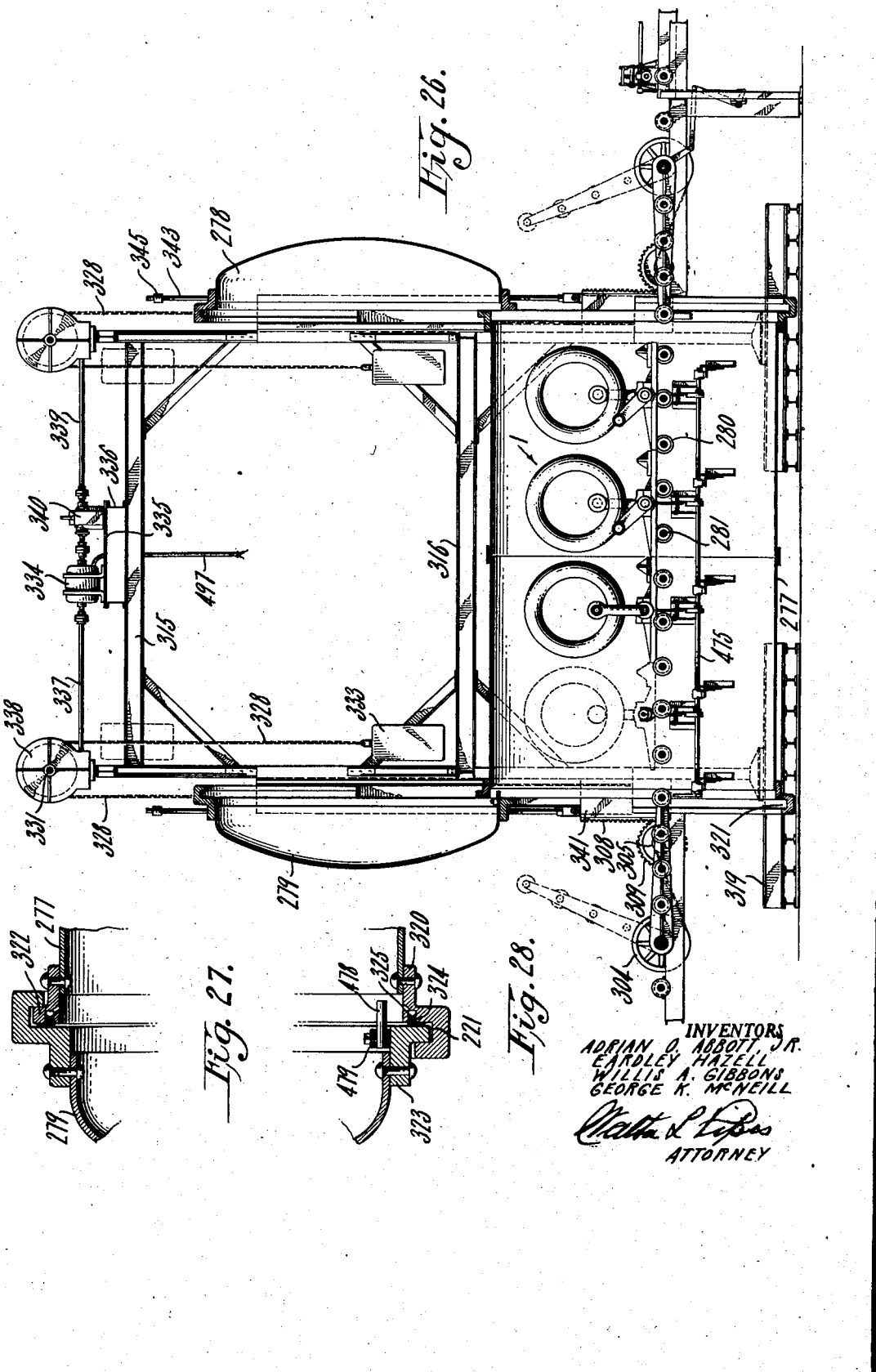

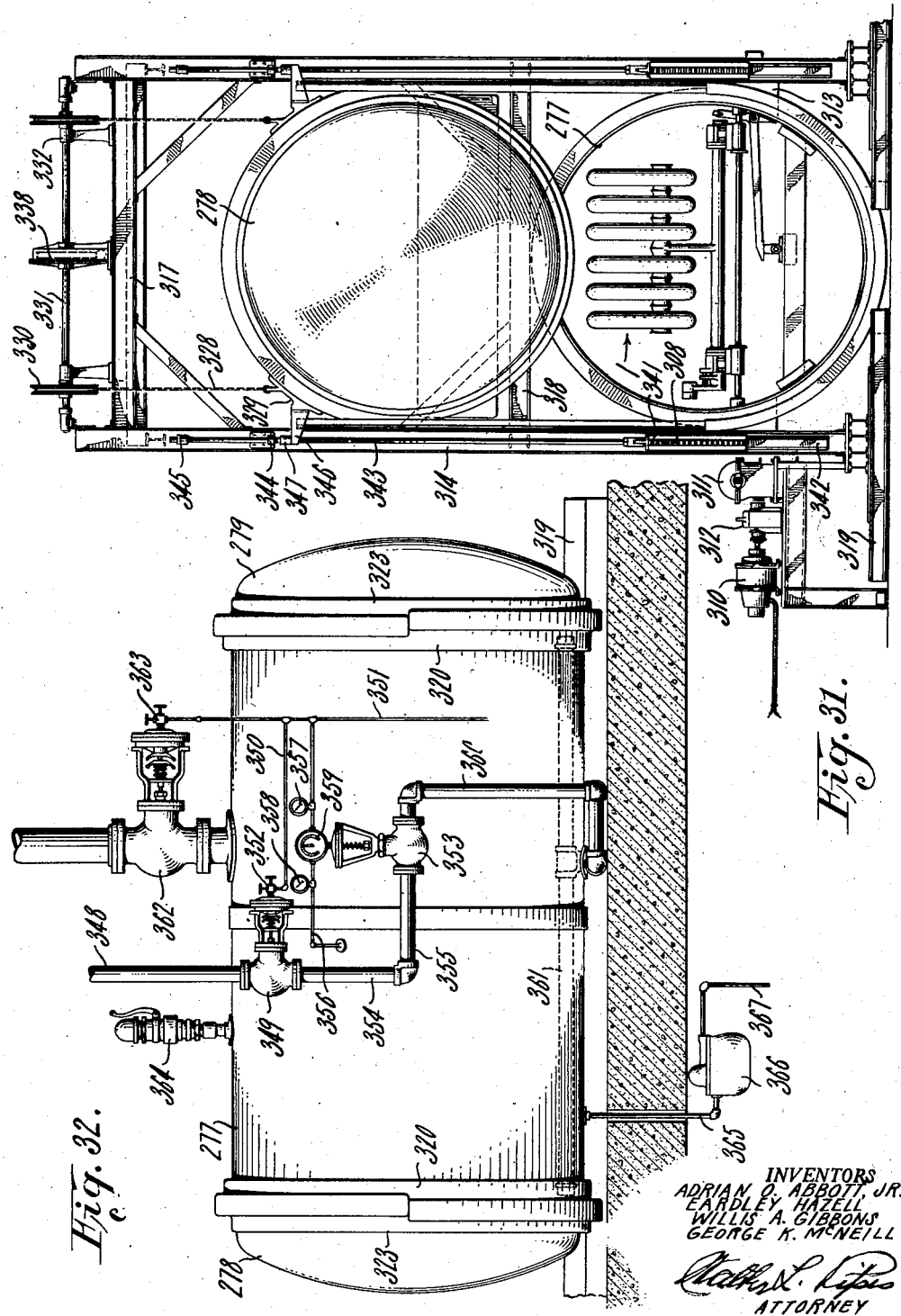

March 29, 1938. A. O. ABBOTT, JR., ET AL 2,112,513
APPARATUS FOR MANUFACTURING LATEX TUBES
Filed Jan. 7, 1933 18 Sheets-Sheet 14

INVENTORS
ADRIAN O. ABBOTT, JR.
EARDLEY HAZELL
WILLIS A. GIBBONS
GEORGE K. McNEILL
ATTORNEY

March 29, 1938.  A. O. ABBOTT, JR., ET AL  2,112,513
APPARATUS FOR MANUFACTURING LATEX TUBES
Filed Jan. 7, 1933  18 Sheets-Sheet 15
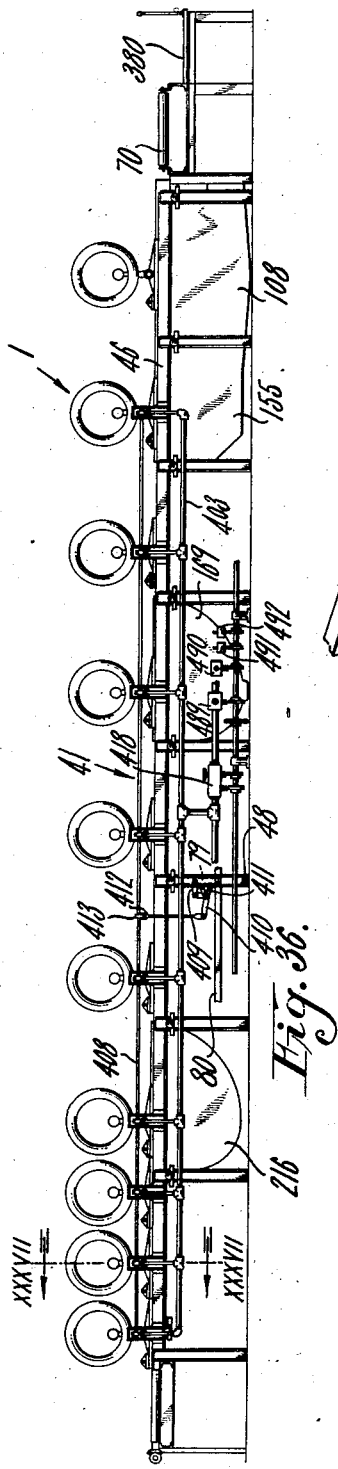
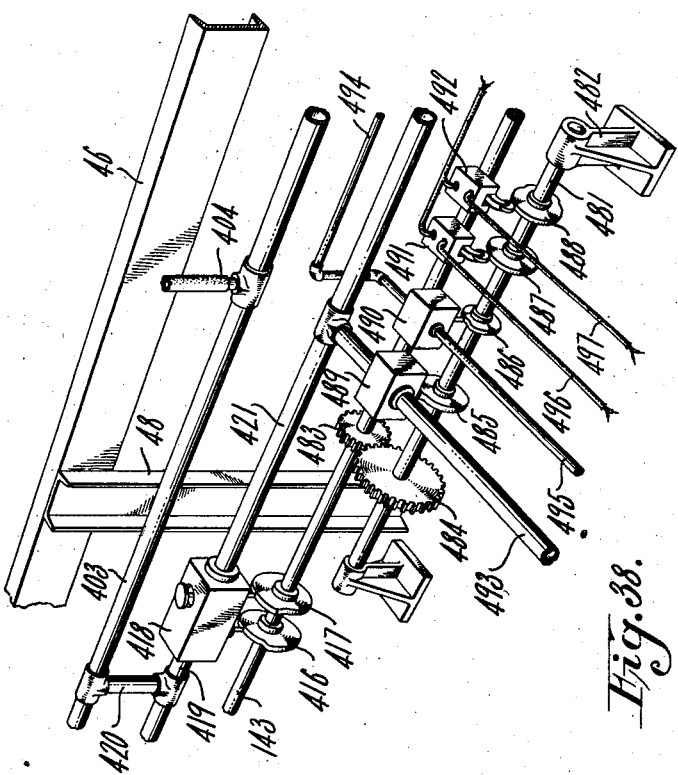
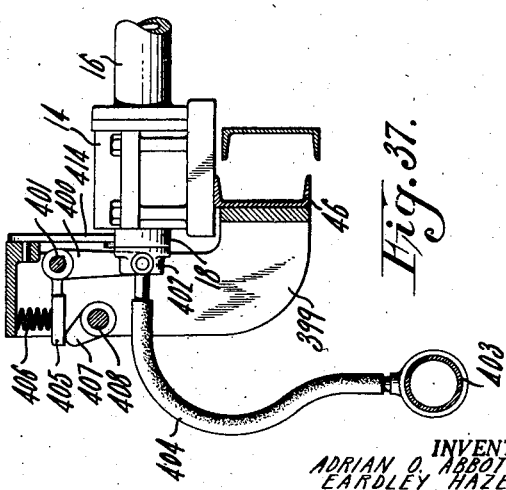
INVENTORS
ADRIAN O. ABBOTT, JR.
EARDLEY HAZELL
WILLIS A. GIBBONS
GEORGE K. McNEILL
ATTORNEY March 29, 1938.　　A. O. ABBOTT, JR., ET AL　　2,112,513
APPARATUS FOR MANUFACTURING LATEX TUBES
Filed Jan. 7, 1933　　18 Sheets-Sheet 16
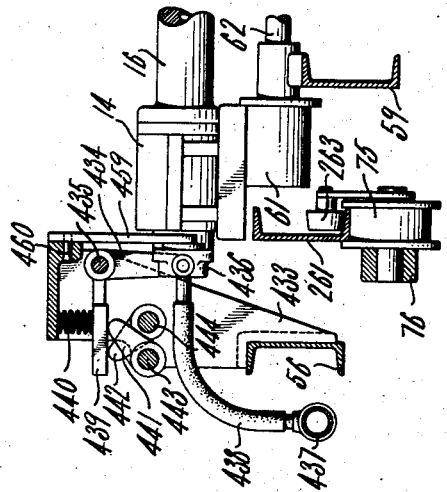
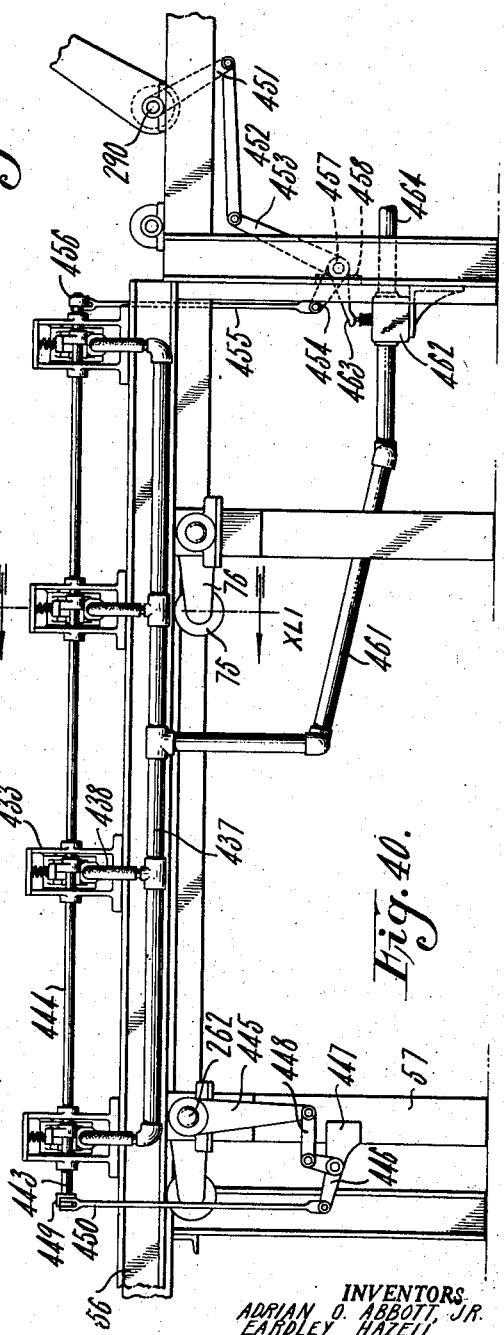
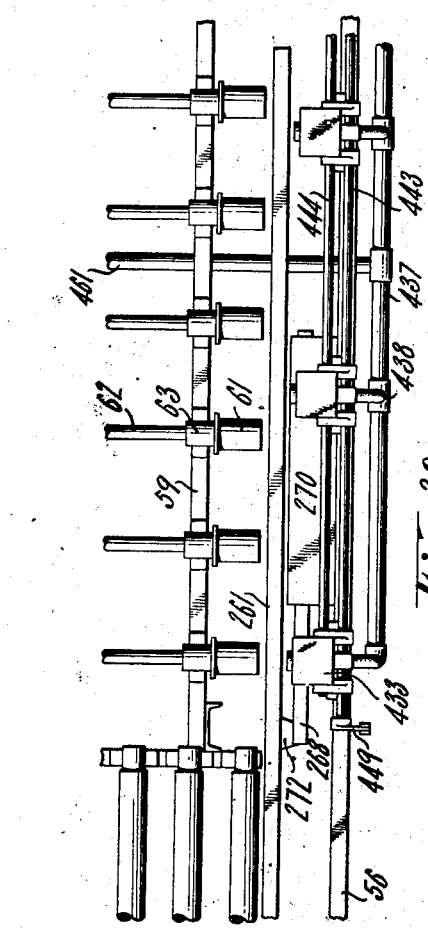
INVENTORS
ADRIAN O. ABBOTT, JR.
EARDLEY HAZELL
WILLIS A. GIBBONS
GEORGE K. McNEILL
ATTORNEY

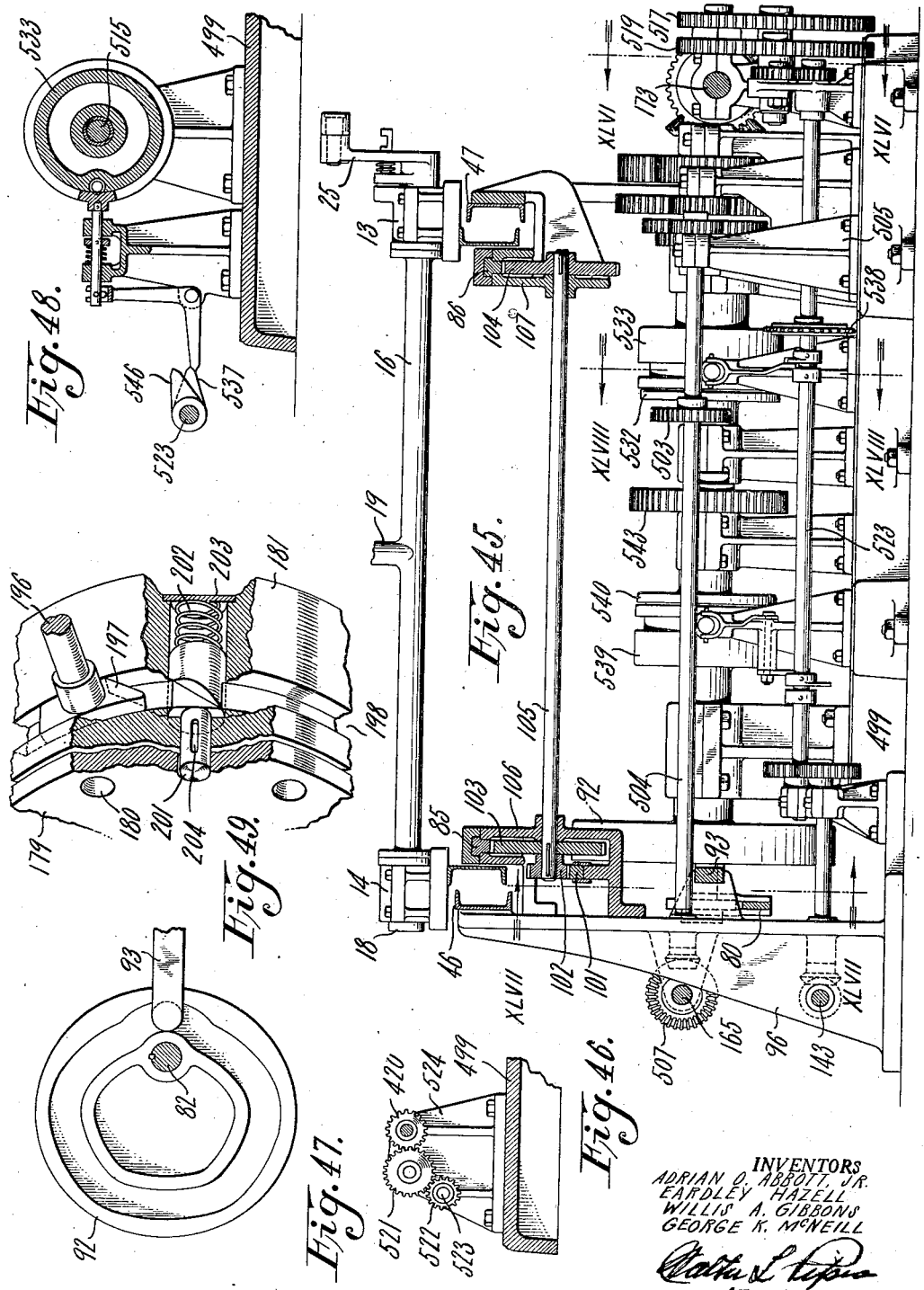

Patented Mar. 29, 1938

2,112,513

UNITED STATES PATENT OFFICE 2,112,513

APPARATUS FOR MANUFACTURING LATEX TUBES

Adrian O. Abbott, Jr., Argentine Township, Genesee County and George K. McNeill, Detroit, Mich., and Eardley Hazell, New York, N. Y., and Willis A. Gibbons, Montclair, N. J., assignors, by mesne assignments, to United States Rubber Company, New York, N. Y., a corporation of New Jersey Application January 7, 1933, Serial No. 650,608

18 Claims. (Cl. 18—4)

The present invention relates to a method and apparatus for manufacturing inner tubes for pneumatic tires by the latex deposition process. In general the apparatus consists of a plurality of mandrels mounted on trucks which are intermittently moved along a conveyor, automatic means for washing the mandrels, means for dipping the mandrels in a clay or chalk solution, and means for sealing the mandrels within a tank for the purpose of vulcanizing the formed tubes by elevated steam pressure. After the formed tubes are removed from the mandrels, the mandrels again pass through the same process.

Among the objects and advantages of the apparatus are that it almost entirely dispenses with manual labor except for stripping the mandrels, with the resultant effect of a uniform product and a saving in the cost of manufacture. The apparatus itself is a complete unit functioning independently of any accessory apparatus or processes, a combination which lends toward expeditious manufacture. Its unitary combination avoids a widespread distribution of operations and results in a saving in floor space. The present invention enables pneumatic tire tubes to be manufactured by the latex process efficiently, expeditiously and economically.

The apparatus is illustrated in the accompanying drawings in which:

Fig. 1 is a plan view of the complete apparatus;
Fig. 2 is a side elevation thereof;
Fig. 3 illustrates an end elevation of the mandrel and truck;
Fig. 4 is an enlarged sectional view of the mandrel joint and truck connection;
Fig. 5 is a plan view of the truck propulsion means and cross conveyor drive;
Fig. 6 is a side elevational view of the apparatus shown in Fig. 5;
Fig. 7 is a plan view of the mandrel washing means and the filter depositing tank;
Fig. 8 is a side view of the apparatus shown in Fig. 7;
Fig. 9 is an end view partially in section, of the mandrel washing means;
Fig. 10 shows a detail view of one of the washing sprinklers;
Fig. 11 is an elevational view of the means for lowering the mandrels into the washer, taken along section line XI—XI of Fig. 9;
Fig. 12 is a plan view showing the engaging means between the truck dipping arm and the actuating means;
Fig. 13 is an elevational view, partly in section, of the apparatus shown in Fig. 12;
Fig. 14 is a plan view of a portion of the latex dipping mechanism;
Fig. 15 is a side elevational view of the apparatus of Fig. 14, taken substantially along section line XV—XV of Fig. 16;
Fig. 16 is an end view of the latex dipping mechanism taken along the section line XVI—XVI of Fig. 15;
Fig. 17 is a plan view of additional latex dipping mechanism cooperating with the mechanism shown in Fig. 14;
Fig. 18 is a side elevational view of the mechanism of Fig. 17;
Fig. 19 is a plan view of the dipping mechanism at the glycerine station;
Fig. 20 is a side elevational view of the mechanism of Fig. 19;
Fig. 21 is a detailed elevational view, in section, taken along section line XXI—XXI of Fig. 20;
Fig. 22 is a plan view of the truck banking section of the conveyor;
Fig. 23 is a side elevational view of the conveyor section of Fig. 22;
Fig. 24 is a detail sectional view of the truck propulsion means taken substantially along section line XXIV—XXIV of Fig. 23;
Fig. 25 is a plan view, in cross section, of the vulcanizer unit;
Fig. 26 is a side elevational view, in cross section, of the vulcanizer unit;
Fig. 27 shows a fragmentary portion, in section, of the upper side of the vulcanizer tank and door;
Fig. 28 is a similar view of the vulcanizer tank and door, at the lower side;
Fig. 29 is an enlarged plan view, in section, of the outlet end of the vulcanizer tank;
Fig. 30 is an end elevational view of the tank end of Fig. 29, in section;
Fig. 31 is an end elevational view of the vulcanizer unit;
Fig. 32 is a side elevational view of the vulcanizer tank and the steam connections;
Fig. 33 is a plan view of the vulcanizer outlet conveyor section;
Fig. 34 is a side elevational view of the conveyor of Fig. 33;
Fig. 35 has been omitted.
Fig. 36 is a side elevational view of the tube formation conveyor section showing the vacuum connections;
Fig. 37 is a detail elevational view, partly in section, of a vacuum connection taken along section line XXXVII—XXXVII of Fig. 36;
Fig. 38 is a perspective view of the timing means for the vacuum, fluid pressure, and electrical connections;

Fig. 39 is a plan view of the vacuum connections at the truck banking conveyor section;

Fig. 40 is a side elevational view of the connections shown in Fig. 39;

Fig. 41 is a detail sectional elevational view of a vacuum connection taken along section line XLI—XLI of Fig. 40;

Fig. 42 is an enlarged end view of the vacuum connection within the vulcanizer tank;

Fig. 43 is a side elevational view, in section, of the connection of Fig. 42;

Fig. 45 is a side elevational view of the mechanism of Fig. 44, looking in the direction indicated by section line XLV—XLV of Fig. 44;

Fig. 46 is an end elevational view of the timing gears taken along section line XLVI—XLVI of Fig. 45;

Fig. 47 is a detail view of the truck propulsion cam, taken along section line XLVII—XLVII of Fig. 45;

Fig. 48 is an end elevational view, partly in section, of the timing clutch taken along section lines XLVIII—XLVIII of Fig. 45; and, Fig. 49 is a perspective detail view, partly in section, of the cam actuating means for the timing clutch.

Mandrel

Figure 9:
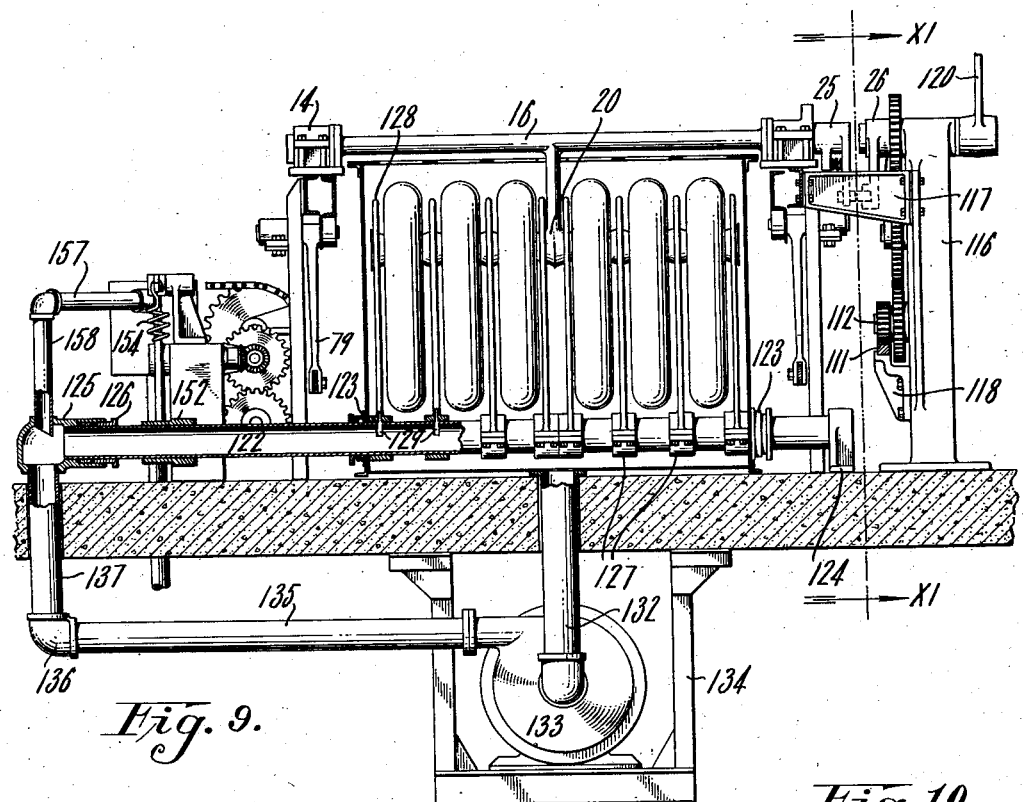

This invention provides an automatic apparatus for performing the progressive operations of making inner tubes on forms or mandrels in accordance with the latex deposition process.

The tube forming mandrel 1 is illustrated in Figs. 3 and 4 and is similar to the mandrel forming the subject matter of the previous application for Letters Patent Serial No. 467,251, filed July 11, 1930, although other types of mandrels may be used. Generally, it consists of members 2 and 3 forming an annular tube, hinged at 4, and obliquely joined at 5 by means of a tubular locking post 6 extending through the member 2 at the oblique joint 5 and having a threaded connection with the member 3. A sleeve 7, rigidly fastened to the member 2, forms a means of support for the mandrel 1. The members 2 and 3 are knurled on their outer surfaces and contain perforations 8. A flexible sleeve 9 covers the hinge 4 to overcome any irregularities at the joint. A fabric material 10, in the form of a seamless annular sleeve, covers the entire surface of the mandrel. As shown in Fig. 3, a filtering layer of clay or chalk may be applied over the fabric sleeve 10. The thus constructed mandrel forms a filtering medium so that upon the application of vacuum to the interior thereof through the tube 6 and its immersion into a solution or dispersion, either natural or artificial, of rubber or rubber-like material, a deposit of the solid particles of which will remain on the outer surface of the mandrel to form the tube.

Mandrel truck

A plurality of the mandrels 1 are mounted on trucks 12 for the purpose of expediting production by simultaneous formation of tubes on the plurality of mandrels. The truck and its details are shown in particular in Figs. 3, 4, 12, 13, 29 and 30. Each truck consists of bracket stands 13 and 14 joined in spaced relation by a cross member 15. A tubular shaft 16 extends between the stands 13 and 14 and is fastened to the hubs 17 and 18 which are rotatably mounted within the bracket stands. An upright 19 extending from the center of the tubular shaft 16 carries a cross-head 20 from which the mandrels are supported by the several sleeves 7. The cross-head 20, upright 19, tubular shaft 16, and hub 18 are apertured and communicate with one another. The aperture is open to the atmosphere at the outer end of the hub 18. The opening in the hub 17 is sealed by the presence of a plug 21.

Fig. 4 shows the connection between a mandrel and the cross-head 20. The sleeve 7 rigidly joins section 2 of the mandrel with the cross-head 20. A projection 22, integral with the connector tube 6, provides external means for turning the tube 6 to unthread it from section 3 and then withdrawing it by longitudinal movement when it is desired to disconnect the mandrel sections for the removal of the finished tube. When the connector tube is in place its aperture completes a communication between the interior of the mandrel and the interior of the cross-head. Gaskets 23, circumscribing a depression 24 at the upper end of the connector tube 6, effectually seal the vacuum within the cross-head from the atmosphere.

In stripping a tube from a mandrel, the tube 6 is first withdrawn to free the sections 2 and 3. The opening in the rubber at the sleeve 7 is then stretched over the end of section 2 and between the sections 2 and 3. The tube is then worked around the mandrel in a clockwise direction as viewed in Figs. 3 and 4 until it slips off the free end of section 3. An air blast may be used to assist in the removal of the tube from the mandrel. After the tube is freed it may be stretched over one or more adjacent mandrels to remove it from the cross-head 20, if necessary.

The engaging means for lowering the mandrels at the various stations is best illustrated in Figs. 12 and 13. A crank arm 25 integral with the hub 17 extends in co-operative relation to a yoke crank arm 26 forming a part of the actuating means. The yoke crank arm is similar at all dipping stations. Crank arm 25 is provided with a roller 27 held in place by a stud 28. A locking means is required to retain the mandrels in an upright position unless in alignment with the actuating means at the various stations. This is accomplished by a locking pin 29 slidable in bosses 30 and 31 projecting from the crank arm hub. The locking pin sockets within a depression 32 in a raised portion 33 of the bracket 13. A compression spring 34 normally retains the crank arm and bracket stand in locked position. A groove 35 on the upper and outer extended end portion of the locking pin cooperates with a cam 36 fastened to the yoke crank arm 26. A guide pin 37 on the locking pin 29 slidable in a slot 38 in the cooperating surface of boss 31 serves to maintain the locking pin groove 35 in an upward position. Figs. 12 and 13 are shown in the position wherein the mandrel truck is moving onward and the crank arms are about to disengage. In this position the cam 36 has allowed the pin 29 to return to its locked position before the crank arms are entirely disengaged. An indentation 39 in the lower side of the bracket-stands has for its purpose to cooperate with a stud 40 on the conveyor frame and to hold the truck assembly in alignment with the actuating mechanisms during its cooperation with same.

Conveyor

Referring in particular to Fig. 1, the conveyor consists essentially of a skeleton-like construction of structural members laid out in a path of rectangular formation. For purposes of explanation the conveyor is divided into the following sections. Section 41, tube formation section; section 42, cross-conveyor section; section 43, truck banking section; section 44, heater outlet section; and, section 45, tube stripping and return section.

Section 41 (Figs. 1 and 2) consists mainly of the horizontal channels 46 and 47 supported in elevated position by structural legs 48. Section 42 (Figs. 5 and 6) joined to section 41 comprises spaced parallel channels 49 and 50, legs 51, and rollers 52 and 53. These rollers are mounted in bearings 54 resting on the channels 49 and 50. With this section, and section 41, a right angle joint is formed. Section 43 (Figs. 22 and 23) is composed of outer horizontal channels 55 and 56 supported by legs 57. Channels 58 and 59, also supported from the legs 57 and from cross-members 60, form a base for a series of flanged rollers 61 fastened to shafts 62 which run in bearings 63. The operation and drive for these rollers are as hereinafter explained. Section 44 (Figs. 33 and 34) contains parallel channels 64 and 65 supported by legs 66. Flanged rollers 67 interposing the parallel channels are keyed to shafts 68 riding in bearings 69. The return section 45 (Fig. 1) joins the heater outlet section and the tube formation section, thereby completing the rectangular conveyor formation. It comprises free rotatable rollers 70 spaced between structural members 71 and 72. In considering the general direction of movement of the conveyor, it will be understood, with reference to Fig. 1, that the lower left hand corner of the conveyor is the starting point and that the trucks move along the conveyor in a counter-clockwise direction.

*Truck propulsion means*

Figure 44:
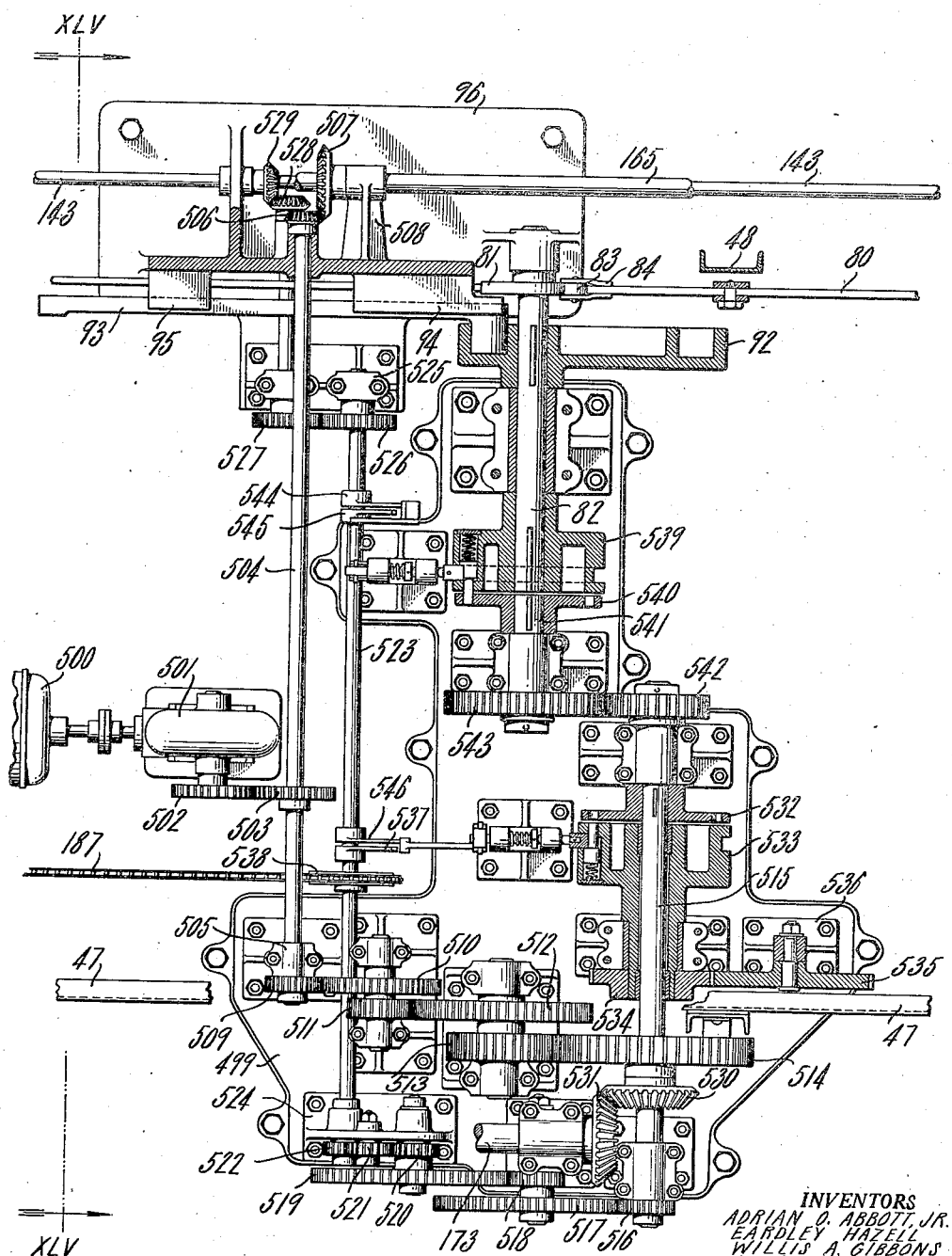
Fig. 44 is a plan view, partly in section, of the drive and timing mechanism.

At the beginning of the conveyor operation a truck is positioned on the free roller conveyor section 45 at the lowermost end as viewed in Fig. 1. The first automatic operation consists in vertically raising the truck off conveyor section 45 and carrying it along to the first station where the truck is lowered and rests upon the conveyor framework channels 46 and 47. This vertical and horizontal moving means is illustrated by Figs. 5 and 6. Channels 73 and 74 close to and parallel with channels 46 and 47 extend in part along the length of conveyor section 41 and overhang the conveyor section 45, as shown in Fig. 1. These floating channels rest on rollers 75 positioned along the length of the conveyor so as to distribute the weight of the trucks. The rollers 75 are suspended from arms 76 keyed to shafts 77 mounted in bearings 78. A downwardly extending arm 79 connects each of the shafts 77 with a connecting link 80. Vertical movement of the channels 73 and 74 is now determined by horizontal movement of the connecting link 80. A cam 81 (Fig. 44) on shaft 82 is actuated by timing means to be hereinafter described. The cam 81 associates with a roller 83 held by a bracket 84 joining the connecting link 80. Through this connecting arrangement the floating channels elevate and lower at the proper intervals according to the actuation of the cam 81 acting against the influence of the force of gravity acting on channels 73 and 74.

Assuming now that the truck is raised off conveyor section 45 by channels 73 and 74, the next step is to move the truck horizontally along to the first station. This is effected by racks 85 and 86 attached to the channels 73 and 74, respectively. The connection is made so as not to interfere with the vertical movement of the floating channels. A projection 87 extending from these racks is interposed between blocks 88 and 89 attached to the floating channels. These blocks are spaced apart sufficiently to allow a vertical slidable fit with the projection 87 therebetween. Brackets 90 and 91 supported from the channels 46 and 47 act as guides for the racks 85 and 86, all respectively.

These racks are reciprocated through the action of cam 92 (Figs. 5, 6, 44 and 47) on shaft 82. The connection therebetween, comprises the cam bar 93 slidable in brackets 94 and 95 projecting from the stand 96. A connecting link 97 joins the cam bar with a lever 98 pivotally connected to a bracket 99 attached to the leg 48. The upper end of the lever joins a second connecting link 100 which in turn pivotally connects with the drive rack 101. Movement of this rack is transmitted to the racks 85 and 86 through the pinion 102 engaging with rack 101, and the gears 103 and 104 engaging with racks 85 and 86 respectively. The gears and pinion are attached to the shaft 105 rotatable in bearings in brackets 106 and 107. The bracket 107 serves as a guideway for the rack 86, and bracket 106 contains a guideway for the racks 85 and 101.

In this way the propulsion means acts to convey the trucks horizontally and intermittently along the conveyor in a direction from left to right as viewed in Fig. 6. A single revolution of the cams 81 and 92 operates to raise the channels 73 and 74, to move them the required distance (preferably about six feet), to lower them and to return them to their original starting point. The additional propulsion mechanism as shown in Figs. 5 and 6 is hereinafter described according to the proper sequence of its operation.

*Mandrel washing station*

The first step in the cycle of operations performed by the present apparatus is to wash the mandrels so as to remove the previous coating of clay or chalk a new one of which is deposited in subsequent operations. This removal of the coating is necessary and a new deposit is required for the reason that the mandrel annulus is broken to remove the finished tube. The separation of the annulus breaks the filter seal and destroys the uniformity of the mandrel surface. Furthermore, the removal of the tube from the mandrel causes the deposit to crumble so that a new coating of clay or chalk is required to properly filter the latex.

Figure 11:
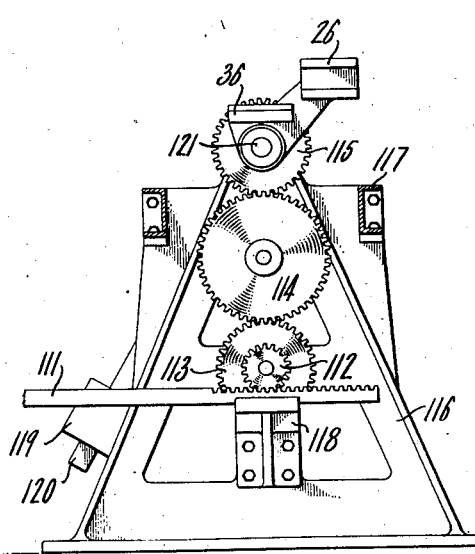

The right hand portions of Figs. 7 and 8 show the washing station. It comprises a tank 108 disposed below and between the horizontal channels 46 and 47. A cover 109 placed on top of the tank and provided with openings 110 for the passage of the mandrels retains the splashings from the washing device within the confines of the tank. As the truck assembly is brought into alignment with the washing station the arm 26 (Fig. 11) engages with the truck crank arm 25 while the cam 36 retracts the locking pin which holds the mandrels in elevated position. A rack 111 actuated by timing means to be hereinafter described transmits rotary movement to the arm 26 through a train of gears 112, 113, 114 and 115. These gears are supported from a stand 116 spaced from the horizontal channel 47 by brackets 117. A bracket 118 supports the rack 111 in guiding relation with the gear 112. In order to counterbalance the off-centered mandrels a counterweight 119 is employed. It is fastened to the lever 120 rigidly attached to the shaft 121 from which the crank arm 26 extends.

Through this mechanism the mandrels are lowered and held in lowermost position for the duration of the washing operation.

As a medium for washing the mandrels in the tank 108 a clay or chalk suspension is used. While the mandrels may be washed with clear water it is preferable to use the same solution as the filter depositing solution. If clear water were used it would be necessary, for economical reasons, to reclaim the solids carried off by the water. Furthermore, the use of the compounded solution as a washing means is more effective than water for its insoluble solids act as an abrasive in the removal of the filter coating on the mandrels. As an example, a 12½% suspension of whiting in water makes a very practical compound to be used either for washing the mandrels or as a filter depositing composition.

Figure 10:
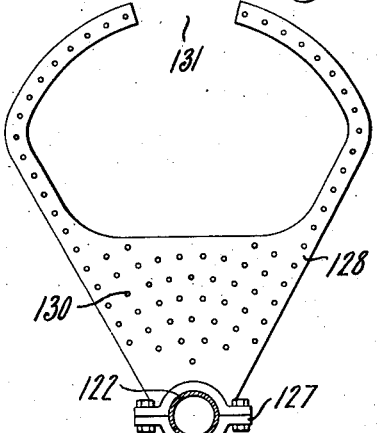
Figure 29:
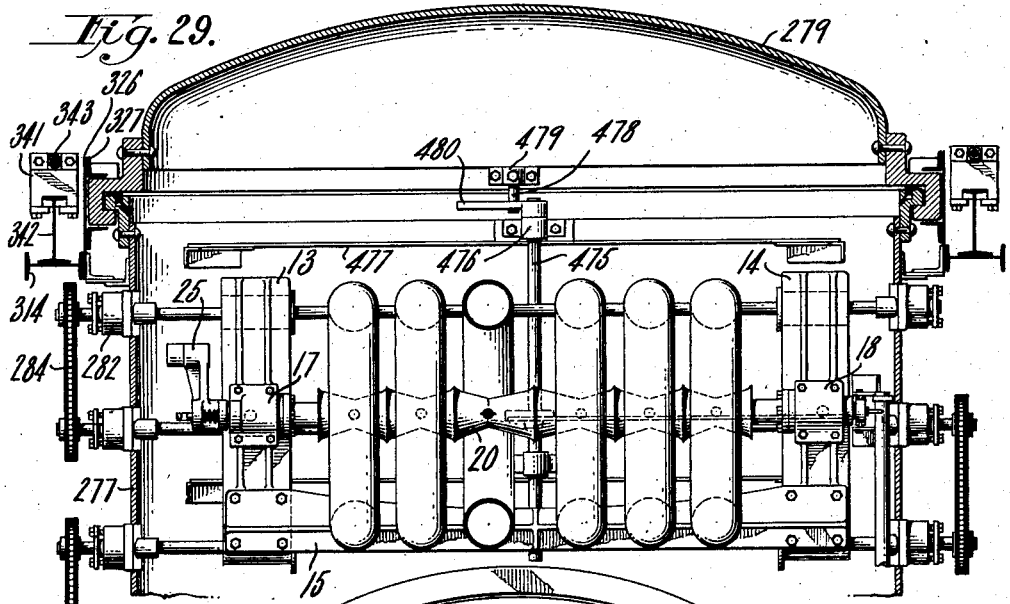
Figure 30:
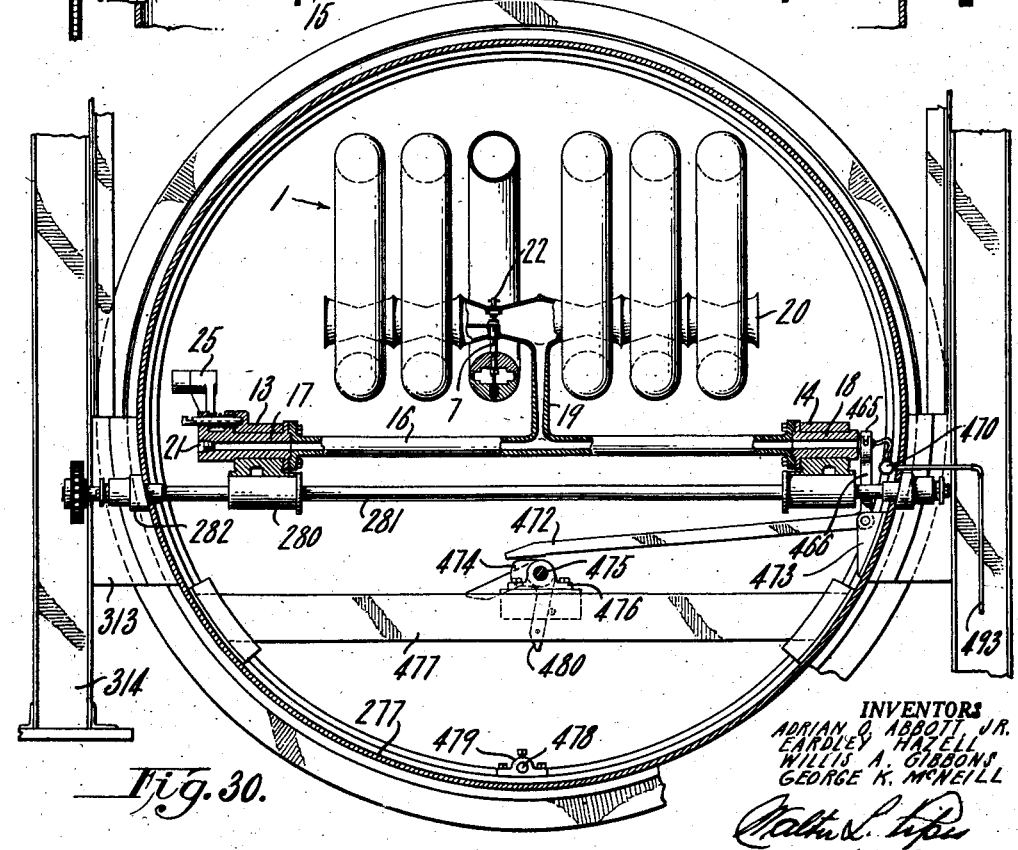

A tubular shaft 122 (Fig. 9) extends laterally of the wash tank, and in a lower central location. Packing glands 123 join the tubular shaft with the tank so as to maintain the latter a liquid tight container. A bracket 124 rotatably supports the closed end of the tubular shaft 122, while a pipe elbow 125 supports the open end of the tubular shaft. This tubular shaft is rotatably connected to the elbow 125 and a packing gland 126 seals the joint. Within the tank a plurality of hubs 127 clamp over the tubular shaft and extend upward forming hollow arcuate segments 128 (Fig. 10). These segments are perforated and communicate with the interior of tubular shaft through slots 129. The segments are spaced along the tubular shaft adjacent the mandrels so that the perforations 130 face both sides of all the mandrels. The opening 131 at the top of the segment permits the truck crosshead 20 for supporting the mandrels to enter below the top of the segment.

A continuous circulating system is provided in washing the mandrels by forcing the solution under pressure out of the segment perforations against the mandrels and allowing the solution to accumulate in the bottom of the tank from whence it feeds back to the pump. A pipe 132 is connected from the bottom of the tank to a centrifugal pump 133 positioned as illustrated (Fig. 9) on the ceiling below by a structural bracket 134. A motor (not shown) for driving the pump is also supported by the bracket 134 and is positioned in axial alignment with the pump. Pipe line 135, elbow 136 and pipe line 137 joining elbow 125 complete the pipe line circulating system. The solution level in the tank is below the bottom of the mandrels as indicated by line 138 (Fig. 8). This level is maintained by a float valve 139 connected to the water line 140. In this way additional water is added to make up for any loss of water due to absorption through the mandrels or by evaporation. The amount of solids or whiting in the water remains practically constant, for the amount which is required to coat the mandrels is brought back when the mandrel is washed in which case the whiting again becomes suspended in the water.

In order to produce a more thorough washing effect, the segments 128 are reciprocated. Reciprocating mechanism is shown in Figs. 7 and 8. A notched or tooth-like cam 141 supported by a bracket 142 is driven continuously from a timing shaft 143 through the gears 144 and 145, shaft 146, and miter gears 147 and 148. A bifurcated arm 149 pivotally joined to bracket 150 fastened to bracket 142 is horizontally positioned above the cam 141. This arm carries a roller 151 which contacts with the cam. It also joins an arm 152, horizontally extending from the tubular shaft 122, by the connecting link 153. A spring 154 holds the roller 151 in firm contact engagement with the cam. The absence of notches on a portion of the cam 141 permits the segments 128 to cease reciprocating while the mandrels are lowered or raised out of the tank. This cessation is necessary in order that the mandrel supporting cross-head 20 may pass through the openings 131 in the segments 128.

Filter depositing station

Annexed to the washing mechanism and cooperating therewith is the filter depositing station, shown in Figs. 7 and 8. When the mandrel assembly is raised out of the washing tank the truck propulsion mechanism operates to bring the mandrel assembly into alignment with the filter depositing station. At this station a similar mechanism to that shown by Fig. 11 lowers the mandrels or removes them from the tank.

A tank 155 at this station consists of a container sufficient in size in which to completely immerse the mandrels. It is open at its upper end. Within the tank, as in the washing tank, there is the clay or whiting solution. The partition wall 156 between this tank and tank 108 is lower than the other walls so that when the tank 155 is filled with the filter solution any surplus will flow over the edge 156 and into the washing tank 108. By providing a continuous feed of the filter solution to the tank 155, a constant flow passes over this lower edge 156. In this way any scum or surface collection is removed from the tank.

Means for effecting a constant supply of the solution is provided by joining pipe line 157 and 158 to the washing station elbow 125. The centrifugal pump 133 has sufficient capacity to force the flowage through these pipes.

A filter or disc screen 159 placed within the reservoir 160 filters out any foreign matter, such as particles of fabric which may accumulate as a result from the washing operation. A pipe 161 and valve 162 enables the sediment in the reservoir 160 to be removed. A pipe line 163 connects the filter 159 with the lower side of the tank 155. The continuous flow of the solution entering at the lower side of this tank agitates the contents and retains the insoluble solids in liquid suspension. The disc filter screen 159 requires an element therein to be rotated so as to keep the discs free from adhering impurities. To accomplish this a cam 164, in the form of an eccentric disc, is attached to the drive shaft 165. An arm 166 linked from the eccentric cam to a lever 167 causes the latter to pivotally reciprocate. A dog on this lever engages with a ratchet wheel 168 and causes the aforesaid elements within the filter 159 to rotate in an intermittent motion. Suitable types of disc filters are shown in Letters Patent Nos. 1,414,120, issued April 25, 1922, 1,581,998 issued April 20, 1926 and 1,673,743 June 12, 1928.

As the mandrels are immersed in the solution vacuum is applied to the interior of the mandrels by connections hereinafter described. With vacuum within the interior of the mandrels the solution is filtered through the fabric covering on the mandrels, the filtrate passing along the interstices of the fabric and into the interior of the mandrels by way of the perforations from whence it is removed through the connections by the vacuum source. The solid particles of the clay or chalk adhere to the outer surface of the fabric and form an even coating thereon. When a sufficient coating is deposited, which is determined by the duration of immersion, the mandrels are removed from the tank and, with the vacuum still applied, the moisture is quickly drawn from the surface leaving a self sustaining coating of clay or chalk on the mandrel surface.

Filter drying station

Upon completion of the filter depositing operation the truck propulsion device operates to again move the mandrels along the conveyor. At the present station the truck with the mandrels is merely permitted to rest on the channels 46 and 47. It remains in this position for a period of time equal to the usual pause required at the washing and coating stations. During this time vacuum is continuously applied to the interior of the mandrels and, together with surface evaporation, the filter coating becomes sufficiently dry so that it may be dipped into the latex at the subsequent station without losing its shape.

While the present disclosure describes the progressive operations relating to a single truck assembly as it passes along the conveyor, it is to be understood that similar trucks are spaced successively about the conveyor and that simultaneously operations are carried on at the various stations.

Latex depositing station

The latex depositing station is principally illustrated by Figs. 14, 15 and 16. It comprises a tank 169 filled with artificial or natural latex, an aqueous solution of rubber or rubber substitute particles held in liquid suspension. A pipe line 170 supplies the latex to the tank. The tank may contain conventional means (not shown) for maintaining a constant level of latex therein.

As the truck and mandrel assembly is brought into alignment with this station the dipping mechanism actuated by the timing device is set into motion. Figs. 17 and 18 show a portion of the timing means which connects with the latex dipping mechanism. A base 171 supports the timing means, in which the bearing bracket 172 supports the drive shaft 173. This shaft connects with the main driving unit and rotates continuously. A miter gear 174 attached to shaft 173 meshes with the miter gear 175 and drives shaft 176. Bearing brackets 177 and 178 resting on the base plate support the driven shaft 176. On this shaft a flange 179 containing holes 180 is keyed. Adjacent to the flange and co-operating therewith a clutch sleeve 181 is rotatably disposed about the shaft 176. With this arrangement an engagement between the flange 179 and clutch sleeve 181 causes the latter to rotate, turning the gear 182 attached to the sleeve, and driving gear 183 held by the shaft 184 and bearing brackets 185 and 186.

From the main timing unit a chain 187 drives sprocket 188 and shaft 189 supported by bearings 190 and 191. Cam levers 192 and 193 attached to the shaft 189 engage with the trip lever 194 pivoted from bracket 195. One end of the trip lever terminates in a yoke which engages with a plunger 196 slidable in bosses extending from the bracket 195. A shoe 197 attached to the opposite end of the plunger rides in a groove 198 in the clutch sleeve. Ordinarily the shoe is retained in the groove by a spring 199 acting against a collar 200 fastened to the plunger.

Fig. 49 illustrates an enlarged perspective view of the clutch engaging and disengaging means. A plunger pin 201 is slidable longitudinally within the clutch sleeve 181 and at such a radial distance from the shaft 176 as to be axially alignable with the holes 180 in the flange 179. The plunger pin is normally held in engagement with the flange holes by a spring 202 compressed between the pin and a disc 203 pressed in a recess in the clutch sleeve. The pin is limited in its movement in the direction of the flange by a pin shoulder bearing against the end of a larger aperture in which it is slidable. As illustrated, a portion of the pin 201 is cut away forming a beveled end which projects above the bottom of the path formed by the groove 198. So as to prevent the cut-away and beveled portion of the pin from rotating, a key is fitted in a keyway 204 at the smaller end of the pin. This allows the pin to move only axially of the pin aperture. The shoe 197 has its forward end beveled for engagement with the beveled portion of the pin 201.

Assuming the parts to be positioned as illustrated in Fig. 49, the flange 179 rotating continuously carries with it the clutch sleeve by reason of the pin 201 being engaged with one of the holes 180. As the pin 201 contacts with the shoe 197 which is held rigid, the beveled edge of the pin is forced up over the shoe bevel and rests on the side of the shoe. This actuation withdraws the pin from the hole 180 and the clutch sleeve ceases to rotate. It remains in this position until the timing cam operates the plunger 196 moving the shoe 197 outward and disengaging the pin 201 allowing it to push against the flange 179 and snap into the first hole 180 that comes into alignment with the pin 201.

Returning now to the gearing system, the gear 183 meshes with a gear 205 keyed to shaft 206 riding in bearing bracket 207. Also keyed to this shaft is a cam 208 in the form of an eccentric wheel. This cam engages with the rack 111 causing a reciprocating movement of the latter, according to the immersion or removal of the mandrels from the tank as shown in Figs. 14 and 15. The same rack 111 in addition to operating at the latex station, simultaneously operates at the mandrel washing station and filter depositing station. At the latex station the rack is guided by the bracket 209 fastened to the frame 210. Gear 211 meshes with the rack. This gear is rotatable on the stud shaft 212 and carries gear 213 keyed at its hub. Gear 213 meshes with gear 214 which in turn meshes with gear 215, thereby completing the mechanism for operating the yoke crank arm 26 at the latex depositing station.

Vacuum connections, hereinafter described, connect with the interior of the mandrels while the truck remains stationary at this station. With vacuum thus applied the mandrels are lowered and immersed into the tank of latex. The combination of the clay or whiting deposit and fabric covering serves as a proper filtering medium so that the material deposited on the clay or whiting filter by vacuum consists almost entirely of the rubber globules, together with a small amount of absorbed non-rubbers; and the filtrate is a serum free from rubber. This filtrate or serum passes through the filtering medium, along the network of intertices formed by the fabric and the knurling on the tube surface, through the perforations and into the interior of the annular unit from whence it is removed through the connections by vacuum.

Latex drying station

Upon completion of the cycle of operation at the latex depositing station it is desirable and means are provided to allow the newly deposited covering on the mandrels to air dry for a period during which time vacuum continues in its application within the mandrels. As shown in Figs. 1 and 2 the trucks carrying the mandrels are allowed to rest on the channels 46 and 47 for two consecutive movements of the propulsion mechanism.

Glycerine dipping station

The third movement of the propulsion mechanism from the latex station carries the mandrel unit into engagement with the glycerine station (Figs. 19, 20 and 21). At this station the mandrel unit is dipped into the tank 216 containing about a 50% aqueous solution of glycerine.

The object of this portion of the apparatus is to improve the physical characteristics of the finished tube. It has been found that the tearing resistance of the tube depends directly on the moisture contained in the composition of the tube. Ordinarily the latex tube withstood tearing remarkably well; however, after aging for a period of time it was found to lose its tearing resistance. It was found that the tearing resistance decreases with the loss of moisture. The exact action that takes place from the glycerine application is not definite; however, its intention is to seal the outer surface of the tube and assist in retaining moisture therein. Due to vacuum within the mandrel at the time of its immersion a small amount of glycerine permeates the entire body of the tube because the rubber at this stage is not completely compacted and is somewhat porous and permeable. The presence of the glycerine results in retention of the water during the subsequent vulcanization and aging, and that this very greatly improves the resistance to tear. An additional advantage of the glycerine application is that it effects a decrease in porosity of the latex tube.

The dipping mechanism at this station is controlled and driven by gears of the main timing and driving unit meshing with gear 217. Shaft 218 supported by bearing bracket 219 is keyed to gear 217 and also to cam 220. This cam engages with a rack 221 slidable in bracket 222 fastened to the frame 223. The rack meshes with gear 224 rotatable on the stud shaft 225. Gear 226 mounted and keyed on the hub of gear 224 meshes with gear 227 which in turn meshes with gear 228 attached to the yoke crank arm.

One half revolution of cam 220 operates to immerse the mandrels in the glycerine solution. After remaining immersed for about one minute the cam through timing means hereinafter described completes its revolution and withdraws the mandrels from the tank.

Truck propulsion change

Up to the glycerine station the truck propulsion mechanism operates to move the trucks in steps of six feet. From the glycerine station it is desirable to bank the trucks close together. The reason for this is that it tends to store the mandrels in order to lengthen the time before the tubes are subjected to vulcanization. It allows the tubes to further air dry while the vacuum continues to remove moisture from the tube interiors. It also allows time for the tube composition to become more compact so as to avoid porosity before it is finally set by vulcanization.

Figs. 5 and 6 illustrate the mechanism for changing the intermittent length of travel of the trucks. The channels 73 and 74 place the trucks in alignment with the glycerine station. While these channels are being retracted, the channels 229 and 230 enter under the truck and at the next period of travel pick up the truck and move it along the shorter distance.

Operation of channels 229 and 230 is somewhat similar to the operation of channels 73 and 74. They are floating channels resting on rollers 75 and are horizontally in alignment with channels 73 and 74. A cross member 231 ties the channels together and adds rigidity to the structure. In general, these channels act as a broken continuation of channels 73 and 74 except that they are slower in movement.

Actuation of these channels is effected by racks 232 and 233 attached to the channels 229 and 230, respectively. The connection is made so as not to interfere with the vertical movement of the floating channels. A projection 234 extending from these racks is interposed between blocks 235 and 236 attached to the floating channels. These blocks are spaced apart sufficiently to allow a vertical slidable fit with the projection 234 therebetween. Brackets 237 and 238 supported from the channels 46 and 47 act as guides for the racks 232 and 233, all respectively.

These racks are reciprocated by rack 101 which operates the channels 73 and 74. The connection between the racks comprises gear 239 meshing with rack 101 and keyed to shaft 240. The same shaft also contains gears 241 and 242 which mesh with racks 232 and 233 respectively. The bracket 243 fastened to the channel 46 acts as a bearing for shaft 240 and as guideways for racks 101 and 232. In like manner a bracket 244 attached to channel 47 acts as a bearing for the outer end of shaft 240 and also acts as a guideway for rack 233.

Cross conveyor section

As shown in Figs. 1 and 2, three truck units are stored at the far end of conveyor section 41. The fourth movement of the conveyor channels, after the glycerine station, operates to transfer a truck unit onto conveyor section 42. Fig. 5 illustrates the clearance so that channels 229 and 230 may pass between rollers 52 and 53. As the truck unit is placed on the cross conveyor section the channels 229 and 230 lower and withdraw, leaving the truck resting on rollers 52 and 53.

As illustrated, the rollers 52 are driven while the rollers 53 are idle. This is permissible for the reason that the resting area of the truck is sufficient to always cover one or more of the driven rollers. These driven rollers are actuated by the general driving shaft 165 (Fig. 6) controlled by the timing shaft 143. A bearing bracket 245 supports the ends of these shafts. On the timing shaft 143 a cam 246 engages with an arm 247 pivotally mounted on a bracket 248 and operates to engage or disengage the clutch 249 on the driving shaft 165. Attached to the determinable rotatable portion of the clutch is a sprocket 250 which connects with a sprocket 251 mounted on the shaft of roller 52 by a chain 252. At the opposite end of this roller is placed the miter gear 253 meshing with the miter gear 254. This drives the shaft 255 held by bearings 256 spaced from the conveyor by the brackets 257. From shaft 255 miter gears 258 drive all alternate rollers 52 by meshing with miter gears 259 attached to the shafts of rollers 52.

As the truck assembly comes to rest on the roller conveyor section, the clutch 249 is engaged by cam 246 on the timing shaft and the rollers 52 are set into motion carrying the truck across the roller conveyor section. As the truck reaches the far end of this section the timing cam 246 releases the clutch, and the rollers 52 cease to rotate.

*Truck banking conveyor section*

This section preceding the vulcanizing chamber (Figs. 22, 23 and 24) removes the trucks which come to rest at the end of the roller conveyor section and moves them along conveyor 43 until four such truck units are banked together, at which time a second propulsion mechanism operates and drives all four of the truck units into the heating chamber.

A somewhat similar mechanism which operates to place the trucks onto the roller conveyor section 42 now operates to remove them from the cross conveyor. Floating channels 260 and 261 rest on rollers 75 carried by the arms 76. Shafts 262 on which the arms are attached extend across to the opposite conveyor to similar attachments and operate simultaneously with the vertical movement of the floating channels of conveyor section 41. In order to prevent the channels 260 and 261 from tipping, an additional roller 263 (Fig. 24) is held against the inner surface of the channel leg by an arm 264 extending upward from the shaft of arm 76. For horizontally propelling the channels 260 and 261 the same shaft 240 is used which propels channels 229 and 230. Attached to this shaft are gears 265 which mesh with gears 266. Racks 267 and 268 are then actuated by meshing with gears 266. Supports for the gears and shafts and guideways for the racks 267 and 268 are formed by the brackets 269 and 270 attached to the frames 55 and 56, all respectively.

The racks 267 and 268 are attached to the channels 260 and 261, respectively, by pins 271 extending from the racks downward into an aperture in brackets 272 fastened to the sides of the channels 260 and 261. These pins fit loosely in the apertured brackets so as not to interfere with the vertical movement of the channels 260 and 261.

The floating channels 260 and 261 pick the truck assemblies up off the conveyor section 42 and allow them to rest on the flanged rollers 63. When four such units rest on the flanged rollers and at the proper time shaft 273 is driven by means hereinafter described. Sprockets 274 and chains 275 connect all the shafts 62 so that all four truck units move off conveyor section 43 simultaneously.

The dotted squares 276 represent vacuum connections which engage with the truck units so as to apply vacuum to the interior of the mandrels. This occurs at all points where the trucks come to rest during their intermittent travel around the conveyor. These vacuum connections will be hereinafter described.

*Vulcanizing station*

The vulcanizing unit in general consists of two divisions. The first is a conveyor section which operates with uninterrupted sequence relative to the whole conveyor system. The second division comprises a tank in which the deposited tubes are subjected to an elevated temperature and pressure for the purpose of vulcanization. Each division cooperates with the other in automatic synchronism.

This station is illustrated by Figs. 25, 26, 27, 28, 29, 30, 31 and 32. At the ends of the tank 277 are doors 278 and 279. To allow the opening and closing of these doors the conveyor section takes the form of a hinged gate at these points. Within the tank are flanged rollers 280 mounted on shafts 281. The shafts extend through the sides of the tank where they are fitted with packing glands 282. At the end of the shafts on the outside of the tank sprockets 283 are attached. Chains 284 engaging with sprockets 283 join all the shafts 281 together by connecting them in pairs alternately from one side of the tank to the other. An extension 285 on one of the shafts terminates with a miter gear 286 which meshes with miter gear 287 attached to the driving shaft 288.

At each end of the tank the conveyor is continued by gate sections which consist of a series of driven flanged rollers pivoted in a manner which enables them to be swung upward so as to provide clearance for the tank door. Inasmuch as both gate sections are alike, one only will be described.

Supported from the horizontal framework 289 is the pivot shaft 290 supporting roller 291 rotatable thereon. From this shaft at the ends of the roller 291 are arms 292 and 293 carrying bearings for shafts 294. Attached to these shafts are flanged rollers 295 which, when in downward position, form a continuation of the paths defined by the flanged rollers 280 within the tank. At the entrance end of the tank, the gate section rollers are driven from the drive shaft 288 by miter gears 296, and 297 attached to the drive shaft 273 of conveyor section 43. Shaft 273 then connects roller 291 by sprocket and chain 298. At the outlet end of the tank, the roller 291 is rotated by sprockets and chain 299 joining the shaft 300 which in turn connects with the drive shaft 288 by miter gears 301 and 302. From roller 291 the shafts 294 are consecutively joined by the sprockets and chains 303.

Pivotal movement of the gate section is accomplished by the raising or lowering of the tank doors. A grooved wheel 304 (Fig. 26) keyed to the pivot shaft 290 is attached to a smaller wheel 305 keyed to a second shaft 306. A chain 307 with its ends attached to the wheels 304 and 305 operates so that vertical movement of a rack 308 meshing with a gear 309 on shaft 306 will cause the conveyor gate section to swing about its pivot 290. A similar pivotal operating mechanism is positioned on each side of the gate sections. The movement of rack 308 is hereinafter described.

The conveyor rollers within the tank, the gate section rollers and rollers in conveyor section 43 are driven from the motor 310 which joins the drive shaft 288 through a gear reduction unit 311. The motor is started and stopped by a cam operated switch to be later described. A magnetic operated brake 312 is positioned between the motor and the reduction unit. This is desirable in order to dispense with continued motion caused by momentum of the rotating part and to insure precision in stopping the truck units in alignment with the vacuum connections. The magnetic brake is a conventional and commercial type cooperable with the motor circuit so as to apply the brake automatically whenever the motor circuit is cut off.

The vulcanizer unit employs a cylindrical tank 277 positioned in longitudinal alignment with the conveyor. It is supported by brackets 313 (Fig. 30) attached to vertical structural posts 314 positioned alongside the ends of the tank. Longitudinal structural members 315 and 316 and lateral members 317 and 318 form a framework which encases the tank. The posts 314 rest on footings 319 so as to distribute the load of the tank unit over a greater area.

The ends of the tank are fitted with rings 320 (Figs. 27 and 28) containing a semi-circular path groove 321 on the lower half while on the upper half a projecting tongue 322 is circumscribed. Doors 278 and 279 carry supplementary rings 323, but these are inverted so as to associate their tongues and grooves with the grooves and tongues, respectively, of rings 320. The two rings are vertically slidable in relation to each other and when the doors are in closed position the rings become longitudinally locked. A gasket ring 324 fitted in a groove circumscribing the end of ring 320 forms a seal when the door is closed. Apertures 325 communicate between the tank interior and the bottom of the gasket groove. The purpose of these apertures is to allow steam pressure when applied within the tank to exert pressure against the back of the gasket and to insure a proper seal between the rings 320 and 323. The above described tank and door construction is a conventional unit on sale by manufacturers and distributors.

Arrangement for guiding the doors in their vertical movements is provided by plates 326 (Fig. 29) extending from posts 314. Vertical angles 327 spaced on the plates 326 form guideways in which the ring 323 on the tank door is vertically slidable. Raising and lowering the doors is effected by chains 328 (Figs. 26 and 31) attaching to brackets 329 fastened to the tank doors. The chains pass up and around pulleys 330 keyed to shafts 331 which are supported by brackets 332. Counterweights 333 connect with the opposite end of the chains 328. Power means for elevating and lowering the doors is provided by a motor 334 resting on a platform 335 supported by channels 336 bridged across the structural members 315. The motor extension shaft 337 drives a worm reduction unit 338 and the shaft 331. In like manner a shaft 339 at the opposite end of the motor drives a similar worm reduction unit. Interposed between the motor and shaft 339 a magnetic brake 340 is disposed. It cooperates with the motor circuit and applies the brake automatically when the motor circuit is cut off. This motor is of the reversible type so that, depending on the cam and switch positions, the doors may be either closed or opened.

The gate conveyor sections are operated by the vertical movement of the doors. Rack 308 is fastened to a bracket 341 (Figs. 29 and 31) which in turn is slidably locked about the foot of a vertical I-beam 342 secured to the post 314. From the rack bracket a rod 343 is linked. This rod extends upward and is slidable in the support bracket 344. A collar 345 pinned at the upper end of the rod terminates the downward movement of the rack by contacting with the boss on bracket 344. As the door raises, a projection 346 on bracket 329 engages the collar 347 pinned to rod 343 and elevates the rack 308. This lowers the gate conveyor section. When the door closes the gate is raised by the release of collar 347 from the projection 346 and by the weight of the bracket 341 which is purposely made heavy to over counterbalance the energy required to raise the conveyor gate section.

The control system for admitting and discharging steam pressure relative to the vulcanizing tank is shown in Fig. 32. The pipe line 348 is connected to a source of steam supply. Connecting this line is reducing and shut-off valve 349. Its purpose is to allow steam to pass at approximately a uniform and predetermined pressure. It is opened and shut off by a fluid pressure line 350 joining line 351 from whence it connects to a cam operated valve (valve 490, shown in Fig. 38) which is actuated in the proper sequence by the timing unit. When fluid pressure is admitted through lines 351 and 350, the valve 349 opens. The closing of the cam operated valve shuts off the valve 349 when the pressure is reduced in the fluid pressure line 350 by a bleeder valve 352 which continually has a small aperture open to the atmosphere. From valve 349 the steam line passes to the pressure regulator diaphragm valve 353 by pipes 354 and 355. This valve operates to maintain a constant pressure within the vulcanizer tank. A connection 356 leads from the interior of the tank to the valve operating mechanism and in this way automatically maintains a uniform pressure within the tank. Like valve 349, it is connected to the fluid pressure line 351. In this way the valve 353 is also opened or shut off, depending on the cam which operates a valve controlling the fluid pressure in line 351. The fluid pressure gauge 357 shows the amount of pressure available and furnishes a means for determining whether or not the pressure is constant. The controlled-pressure gauge 358 indicates the pressure as maintained within the tank by the regulator. The dial 359 provides adjustable means in which, by moving the indicator needle, the regulator is changed so that by observing the controlled-pressure gauge the desired pressure may be readily obtained. From valve 353, the pipe 360 carries the steam line to the interior lower side of the tank. Here a perforated longitudinal pipe 361 capped at both ends injects the steam distributively within the tank. The exhaust valve 362 attached at the top of the tank is controlled by fluid pressure line 351 so that admission of pressure into this line operates to close the valve, while the absence of pressure within line 351 allows the valve 363 to open by spring action. As in valve 349, a bleeder aperture at 363 permits the pressure within line 351 to reduce to atmospheric pressure when the valve which operates it is closed.

With this system the valves are controlled so that steam pressure may be admitted to the tank or released therefrom by the mere operation of admitting or cutting off the fluid pressure within the controlled line 351. A pop valve 364 is added for purposes of safety. At the lower side of the tank a drain line 365 connects with a hydromatic trap 366 for the purpose of removing any condensate which may accumulate within the tank. Such condensate is carried off by the drain 367.

*Vulcanizer outlet conveyor section*

Figures 33, 34:
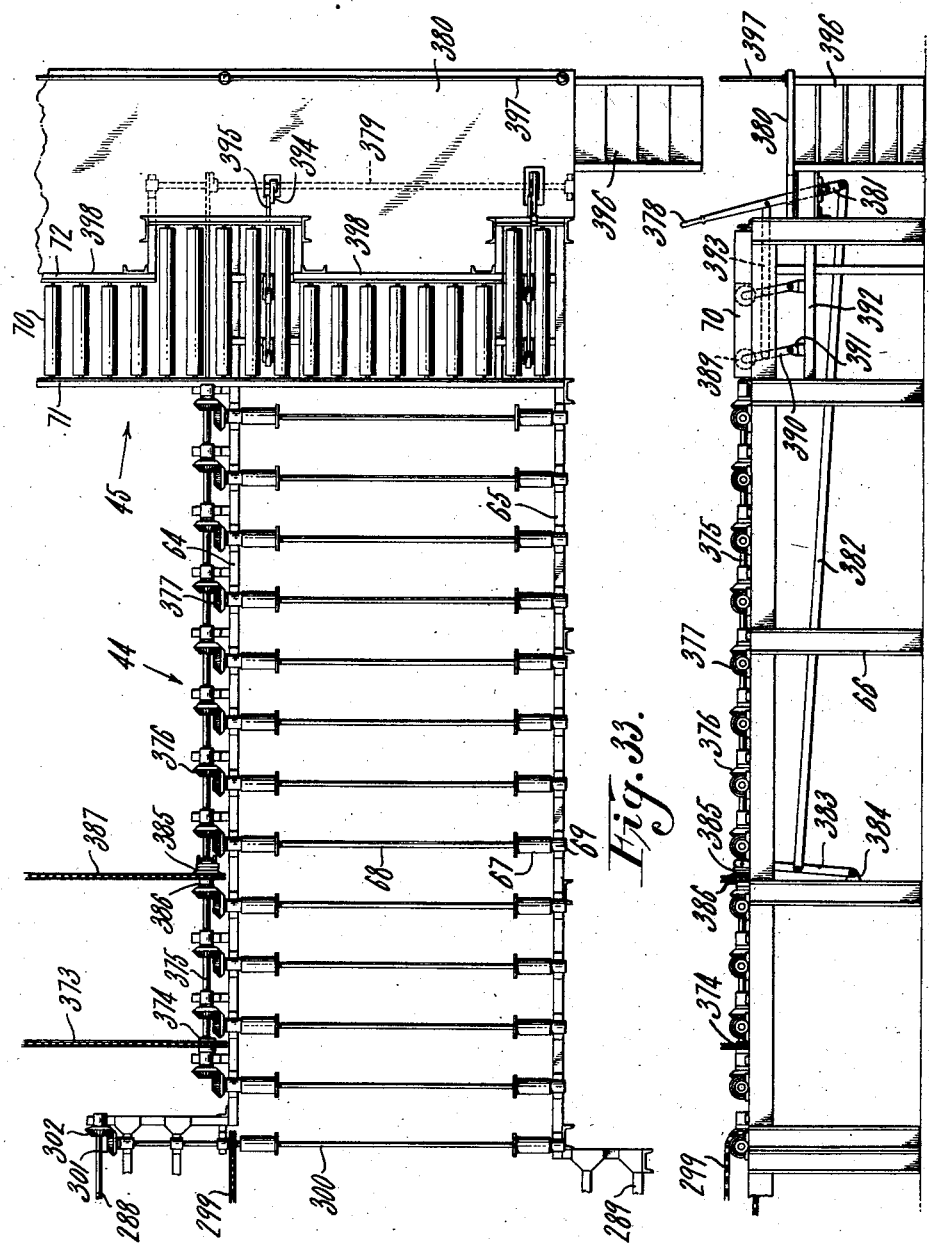

After the vulcanizing operation is complete the doors of the tank open, the gate conveyor section descends, and the flanged rollers are set into motion carrying the four truck units out of the tank and onto conveyor section 44 (Figs. 33 and 34). The flanged rollers 67 of the latter conveyor section rotate in synchronism with the rollers within the tank. When the four truck units have completely emerged from the tank they come to rest on conveyor section 44. The rollers at this section are driven from the opposite conveyor section (Figs. 7 and 8) by the drive shaft 165 through the clutch 368 joining the sprocket 369. Clutch 368 is operated by a cam 370 keyed to the timing shaft 143, and arm 371 pivoted to the bracket 372. This communicates movement to clutch 368 through the chain 373, causing rollers 67 to be rotated in proper sequence in coordination with the vulcanizer unit rollers. Sprocket 374 keyed to the longitudinal shaft 375 meshes with the chain 373. Miter gears 376 on the longitudinal shaft engage with miter gears 377 attached to shaft 68, thus completing the automatic drive to this conveyor section.

In addition to the automatic means for rotating the rollers 67, these rollers may be rotated at the will of the operator by manual movement of the lever 378. This lever, keyed to a shaft 379 positioned below the operator's platform 380, joins a short arm 381 which in turn engages with the connecting bar 382. The opposite end of the bar joins the clutch yoke arm 383 pivoted to the bracket 384 attached to the conveyor frame leg 66. Clutch arm 383 engages with the clutch 385 which controls the rigid or free movement of the sprocket 386 relative to the shaft 375. Chain 387 crosses over to the opposite conveyor section (Figs. 7 and 8) and meshes with the sprocket 388 attached to the continuous rotating drive shaft 165.

*Tube stripping and return section*

The truck units remain on conveyor section 44 until the operator desires to transfer them to the tube stripping section. The transfer operation is accomplished with the assistance of narrow rollers 389 at right angles to and interposed between rollers 70 in the path of the conveyor rollers 67. These narrow rollers are rotatably mounted on arms 390 pivoted at the lower end to brackets 391 supported by a cross-bar 392 joining the framework. One pair of the arms 390 joins the hand lever 378 by a connecting link 393. The other pair of arms joins a lever 394 extending upward from the shaft 379 by a connecting link 395.

The narrow rollers are located at such elevation so that they ordinarily remain below the level of the rollers 70, but when the hand lever is thrust in operative position the periphery of these rollers extends slightly above the rollers 70. When it is desired to transfer a truck unit to the stripping section the operator moves the hand lever in active position. This lever then engages clutch 385 rotating rollers 67 and propelling the truck onto conveyor section 45, allowing the truck to rest on rollers 389. With the truck in this position the operator reverses the lever movement, causing the rollers 67 to cease rotating and at the same time lowering the truck and allowing it to rest on rollers 70.

Conveyor section 45 provides a place where the operator may remove the pins 6 which hold the mandrel sections together, and then proceed to strip the tubes from the mandrels. The operator performs these operations as described under the heading Mandrel truck. The platform 380, steps 396 and railing 397 are added for the operator's convenience. Indentations 398 in this conveyor section permit the operator to stand close to the mandrels so that he may more readily remove the finished tube. When the tubes are stripped, the operator locks the mandrel sections together by the pin 6, then pushes the truck unit to the opposite end of the conveyor 45 where they are automatically picked up by the channels 73 and 74 and continued onward in another cycle of operation.

*Vacuum connections*

From the filter depositing station and continuing onward to and including the vulcanizer station, vacuum connections are made with the truck units at every point where the truck units come to rest. At these resting points along conveyor section 41 a bracket 399 (Figs. 36 and 37) extends upward from the channel frame 46 and carries a yoke arm 400 pivoted at 401. The yoke arm hingedly attaches to a cup 402 in alignment with the open aperture in the hub 18 of the truck unit. The cup 402 communicates to a vacuum line 403 through a flexible hose 404. Joining the yoke arm at right angles is a lever 405 which normally presses the vacuum cup against the truck hub by reason of a spring 406 compressed between the lever 405 and the top of bracket 399.

Cam 407 on cam shaft 408 reacts against spring 406 to force the vacuum cup away from the truck hub when the truck is about to be set in motion. The cam shaft is actuated from one of the downward extending arms 79 which forms a part of the lever system for elevating the floating propulsion channels. Connecting this arm is a link 409 joining a right-angle lever 410 pivoted to the bracket 411 extending from the frame leg 48. A connecting rod 412, linked between lever 410 and a lever 413 attached to the cam shaft, completes this unit of levers.

In order to insure against an open vacuum cup, as in the case if a truck should be omitted during one of the cycles, a pendulum stop 414 is provided. This pendulum is pivoted at 415 above the vacuum cup and adapted to rest by gravity in front and against the cup so as to seal the cup opening. The pendulum being in the path of the truck hub 18 is swung over the top of the hub when the truck passes by the pendulum.

Vacuum as applied to these connections is turned on and off by a cam 416 (Fig. 38) located on the timing shaft 143. The cam 417 opens the pipe line 403 to the atmosphere when cam 416 operates to close the vacuum. Cooperating with the same is the valve box 418 joining the vacuum line 403 by pipe 419 and 420. The valve box also connects with pipe 421 which extends to a source of vacuum.

Turning now to the next type of vacuum connection, we come to the resting point of the truck unit at the end of the cross-over conveyor section 42 (Figs. 22 and 23). This vacuum connection is an independent unit. It comprises a vacuum cup bracket 422 fastened to the frame 56 and in alignment with the open aperture in the hub 18 of the truck unit. A vacuum line 423 connects the cup bracket with a valve box 424. Pipe 425 leads from the valve box to a source of vacuum. Actuation of the valve is caused by the truck frame 14 striking the plunger 426 slidable in the bracket 427. Connecting levers 428 and 429 connect with the plunger and the valve shaft 430, forming the compound connection from the plunger to the valve actuating lever 431. As the truck frame rests against the plunger the vacuum connection is opened, and when channels 260 and 261 pick the truck unit off conveyor section 42, the plunger slides in disengagement with the truck frame, and through the valve spring 432 the vacuum is shut off.

The next set of vacuum connections is illustrated by Figs. 39, 40 and 41. These connections fitted to the conveyor section 43 are, in general, similar to the connections at section 41. Each connection is composed of a bracket 433 extending upward from the frame channel 56. A yoke arm 434 pivoted at 435 hingedly attaches to a cup 436 in alignment with the open aperture in the hub of the truck unit. The cup 436 communicates to a vacuum line 437 through a flexible hose 438. Joining the yoke arm at right angles is a lever 439 which normally presses the vacuum cup against the truck hub by reason of a spring 440 compressed between the lever 439 and the top of the bracket 433.

Cams 441 and 442 on cam shafts 443 and 444, respectively, react against spring 440 to force the vacuum cup away from the truck hub when the truck is about to be set in motion. On this conveyor section, the double cam action is required for the reason that this section operates partly in synchronism with section 41 and partly in synchronism with the vulcanizer conveyor system. Cam 442 on shaft 444 is actuated from the floating channel vertical movement operating shaft 262. Connecting this shaft is a downwardly extending arm 445. A right-angle lever 446 pivoted to the bracket 447 attached to the frame leg 57 joins the arm 445 by the connecting link 448. The other extension of the right-angle lever joins an arm 449 attached to the cam shaft 444 by the connecting rod 450.

Cam shaft 443 is actuated by pivotal movement of the gate conveyor section in such a way that when the gate section is lowered the vacuum cups are moved away from the truck hub, while the gate in elevated position permits the vacuum cups to engage with the truck hubs. An arm 451 attached to the pivot shaft 290 of the gate section is connected to the cam shaft by a series of levers 452, 453, 454, 455 and 456. Levers 453 and 454 are rigidly attached to the shaft 457 supported by bearings 458.

Similar to the vacuum connections at conveyor section 41 a pendulum 459 is pivoted at 460 above the vacuum cup and adapted to rest by gravity in front and against the cup so as to seal the cup opening when no truck is positioned in alignment with the vacuum cup.

Vacuum as applied to connections at section 43 is turned on and off by a double set of valve boxes. The vacuum line 437 is continued by pipes 461 to the valve box 462. This valve box is operated by an arm 463 attached to shaft 457 which is controlled by movement of the gate conveyor section. It operates to close the valve when the gate section is lowered, and to open it when the gate is raised. Continuing from valve 462 a pipe line 464 leads to line 419 (Fig. 38) and connects with the valve box 418. The double set of valve boxes enables the vacuum connections to be controlled in synchronism with both the movement of the conveyor section 41 and with the operation of the vulcanizer conveyor unit.

The last set of vacuum connections are those within the vulcanizer tank. A vacuum cup 465 (Figs. 30, 42 and 43) is pivotally embraced within the yoke arm 466. A flexible material ring 467, such as rubber, forms the contact medium between the cup and the truck hub 18. This is held in place by a retaining ring 468 and screws 469. The cup aperture leads to a vacuum line 470 through the flexible hose 471. The yoke arm forming an L-shaped lever with the extension member 472 is pivoted at its intersection to a bracket 473 attached to the inside of the tank. Movement of the vacuum cup in engagement and disengagement with the truck hub is effected by operation of cam 474 located on cam shaft 475. This cam shaft supported by bearings 476 held by the cross-bar 477 operates by vertical movement of the door 279. A projecting lug 478 extending from a bracket 479 fastened to the door ring 323 engages with the double arm 480 disposed at the end of the cam shaft in such a manner so that as the tank door raises, the vacuum cups are moved in disengagement with the truck hub; while, conversely, the downward movement of the door operates to engage the vacuum cups with the truck hubs.

Control distributing unit

Fig. 38 illustrates the means by which vacuum, fluid pressure and electrical energy are supplied to the various stations in proper sequence. Cam shaft 481 supported by bearing brackets 482 is driven from the timing shaft 143 by the gears 483 and 484. Cams 485, 486, 487 and 488 positioned along the cam shaft, operate control boxes 489, 490, 491 and 492, respectively. Valve box 489 connects to a source of vacuum through pipes 421, and leads to the vacuum line 470 within the vulcanizer tank by the connecting pipe 493. The valve box 490, for operating the steam controls, has a line 494 which leads to a fluid pressure supply, and a line 495 joining the valve box with the steam control line 351. Motor operating switches 491 and 492 control the operation of motors 310 and 334 respectively. The respective wires 496 and 497 connect the switches with the motors, while wires 498 join the switches with a source of electrical energy.

Timing and driving mechanism

This concluding mechanism is illustrated by Figs. 44, 45, 46, 47, 48 and 49. The timing and driving mechanism is located below the conveyor section 41 between the latex and glycerine stations. A base 499 forms a foundation on which the various brackets are supported. From motor 500 the shaft speed is cut down by the reduction unit 501. Gears 502 and 503 join the reduction unit with a shaft 504 supported at one end by a bearing in frame 96, and at the other end by a bearing bracket 505 extending from the base 499. One end of this shaft terminates with a bevel gear 506 meshing with bevel gear 507 attached to shaft 165. At this point the driving shaft 165, which extends longitudinally along conveyor section 41, is supported by a bracket 508 projecting from the frame 96. The opposite end of shaft 504 drives the timing shaft 143, through a chain of gears 509, 510, 511, 512, 513 and to gear 514 keyed to the counter-shaft 515. From shaft 515 a second chain of gears 516, 517, 518, 519, 520, 521 and 522 carry movement to the sub-timing shaft 523 supported at one end by bracket 524 on base 499, and at the other end by bracket 525 extending from frame 96. All intermediate gears are carried by shafts and brackets attached to the base 499. From shaft 504 the connection between the motor and the timing shaft is completed by gears 526 and 527 and miter gears 528 and 529.

On the counter-shaft 515 a miter gear 530 is also mounted, and meshes with miter gear 531 on shaft 173. Shaft 173 is the drive shaft for the latex dipping mechanism.

Counter-shaft 515 has also for its purpose to act as a drive shaft for the glycerine dipping mechanism. On this shaft, flange 532 is keyed. The flange cooperates with clutch sleeve 533 on which is keyed gear 534 meshing with gear 535 held by bracket 536. The glycerine unit is then driven by gear 535 meshing with gear 217. In order to operate the clutch, the flange 532 engages with the clutch sleeve 533 in a similar manner as described in connection with the clutch operation at the latex station (Figs. 17 and 49). In the latter mechanism the clutch is operated by cams 546 and 537 keyed to the sub-timing shaft 523. The latex unit clutch cams are also operated by the sub-timing shaft 523 through the sprocket 538 and chain 187.

On the timing and driving unit a second clutch arrangement controls movement of the truck propulsion and elevating channels. This clutch 539 is driven from a flange 540 keyed to a short shaft 541 in alignment with shaft 82. Shaft 541 is continuously rotated from the counter-shaft 515 by inter-meshing gears 542 and 543. Clutch 539 is actuated by cams 544 and 545 on the sub-timing shaft 523, and operates similar to the previously described clutches.

On the whole, the timing and driving unit operates to control the apparatus in general, to operate the various stations in their proper sequence, and to provide a suitable drive for the particular movements required to operate the apparatus in a manner substantially as described.

We have shown and described a hollow porous mandrel, but it is to be understood that certain features of the invention are applicable to other forms of mandrels such as solid mandrels, heated mandrels and a heat-sensitive latex, and mandrels covered with a coagulant.

While we have shown and described a present preferred embodiment of our invention, it is to be understood that it may be otherwise embodied within the spirit of the invention and the scope of the appended claims.

Having thus described our invention, what we claim and desire to protect by Letters Patent is:

1. In combination, a plurality of tanks containing fluids of different characteristics, a mandrel, means for progressively moving the mandrel from tank to tank and immersing the mandrel in the fluids in the successive tanks, and means disposed in fixed cooperative relation to the several tanks for engaging and applying a vacuum to the mandrel during the periods of immersion.

2. In combination, a plurality of stations, a mandrel, means for progressively moving the mandrel from station to station, and fixed means disposed at the several stations for engaging and applying a vacuum to the mandrel while at each station.

3. In combination, a plurality of stations, a mandrel, means for progressively moving the mandrel from station to station, means permanently disposed at the several stations for engaging and applying a vacuum to the mandrel while at the stations, and means synchronized with said moving means for controlling the periods of application of said vacuum means.

4. In combination, a plurality of stations, means for progressively moving mandrels from station to station and permitting the mandrels to pause at the successive stations, and means controlled by the mandrel moving means permanently disposed at the several stations for applying a vacuum to the mandrels while at the several stations.

5. In combination, a truck, a mandrel pivotally mounted thereon, means for progressively moving the truck from station to station, a crank arm carried by said truck for controlling the position of the mandrel thereon, and stationary members having surfaces complemental to that of the crank arm associated with the several stations for engaging the crank arm and moving the mandrel associated therewith.

6. In combination, a truck, a pivotal support carried thereon and comprising a crank arm, means for progressively moving the truck from station to station and causing the truck to come to rest at the successive stations, and means having surfaces complemental to that of the crank arm associated with each station for engaging the crank arm to move said support.

7. In combination, a truck, supporting means for pivotally mounting a mandrel carried by the truck and comprising a crank arm, a plurality of stations, means for progressively moving the truck from station to station and causing it to come to rest at each station, and stationary means having surfaces complemental to that of the crank arm disposed at each station for engagement with the crank arm for movement of a mandrel mounted on said truck.

8. In combination, a plurality of tanks, a truck, means for pivotally mounting a mandrel on said truck comprising a crank arm, means for progressively moving the truck from tank to tank and causing it to come to rest at each tank, and means disposed at each tank for cooperating with the crank arm to move the crank arm to immerse and withdraw a mandrel mounted on each truck into and from the several tanks.

9. In combination, a plurality of tanks, a truck, means for pivotally mounting a mandrel on said truck comprising a crank arm, means for progressively moving the truck from tank to tank and causing it to come to rest at each tank, means disposed at each tank for cooperating with the crank arm to move the crank arm to immerse and withdraw a mandrel mounted on each truck into and from the several tanks, and means carried by the truck for locking the arm in a position to maintain the mandrel in a raised position during the periods of its movement from tank to tank.

10. In combination, a plurality of tanks, a truck, means for pivotally mounting a mandrel on said truck comprising a crank arm, means for progressively moving the truck from tank to tank and causing it to come to rest at each tank, means disposed at each tank for cooperating with the crank arm to move the crank arm to immerse and withdraw a mandrel mounted on each truck into and from the several tanks, means carried by the truck for locking the arm in a position to maintain the mandrel in a raised position during the periods of its movement from tank to tank, and means cooperating with each tank for controlling the locking means to permit movement of the crank arm.

11. In combination, a plurality of tanks, a truck, means for pivotally mounting a mandrel on said truck comprising a crank arm, means for progressively moving the truck from tank to tank and causing it to come to rest at each tank, and means disposed at each tank for cooperating with the crank arm to move the crank arm to immerse and withdraw a mandrel mounted on each truck into and from the several tanks, said mounting means comprising a counterweight for the mandrel.

12. In combination, a movable support for a mandrel comprising a hollow shaft, means for progressively moving the support from station to station, and means disposed at the stations for engaging said shaft to apply a vacuum to the mandrel.

13. In combination, a movable support for a mandrel comprising a hollow shaft, means for progressively moving the support from station to station, and means disposed at the stations for applying a vacuum to said hollow shaft comprising a cap automatically engaged by the shaft during its movement.

14. In combination, a station for applying a coating to mandrels, a station for applying a deposit of rubber or rubber compound, a station for applying a treating bath, means for progressively moving a mandrel from station to station, means for causing the successive immersion of the mandrel at each station, and means permanently mounted at each station for applying a vacuum to the mandrel while immersed at each station.

15. In combination, a tank, means for washing a mandrel disposed within the tank, a second tank, a liquid deposited therein for covering a mandrel, and means for circulating the liquids between the tanks.

16. In combination, a station for washing mandrels of a clay deposit, a second station for applying a clay deposit to the mandrels, each of said stations comprising a tank, and means for circulating liquid between the tanks.

17. In combination, a plurality of stations for treating hollow forms, and means for progressively advancing forms from station to station comprising beams for periodically raising and advancing a mandrel.

18. In combination, a plurality of stations for treating hollow forms, means for progressively advancing forms from station to station comprising beams for periodically raising and advancing a mandrel, and means for imparting an orbital movement to the beams.

ADRIAN O. ABBOTT, Jr.
GEORGE K. McNEILL.
EARDLEY HAZELL.
WILLIS A. GIBBONS.